(12) United States Patent
Takahashi et al.

(10) Patent No.: US 10,566,634 B2
(45) Date of Patent: Feb. 18, 2020

(54) FUEL CELL UNIT AND FUEL CELL ARRAY

(71) Applicant: MORIMURA SOFC TECHNOLOGY CO., LTD., Komaki-shi, Aichi (JP)

(72) Inventors: Yuya Takahashi, Fukuoka (JP); Hiroshi Shirahama, Fukuoka (JP); Masayuki Yamada, Fukuoka (JP); Riku Takeshita, Fukuoka (JP); Yasuo Kakinuma, Fukuoka (JP)

(73) Assignee: TOTO LTD., Fukuoka (JP)

( * ) Notice: Subject to any disclaimer, the term of this patent is extended or adjusted under 35 U.S.C. 154(b) by 109 days.

(21) Appl. No.: 15/894,627

(22) Filed: Feb. 12, 2018

(65) Prior Publication Data

US 2018/0301715 A1     Oct. 18, 2018

(30) Foreign Application Priority Data

Feb. 10, 2017  (JP) ................................. 2017-022868
Feb. 10, 2017  (JP) ................................. 2017-022869

(51) Int. Cl.
| | | |
|---|---|---|
| *H01M 8/00* | (2016.01) | |
| *H01M 8/1007* | (2016.01) | |
| *H01M 8/241* | (2016.01) | |
| *H01M 8/021* | (2016.01) | |
| *H01M 8/0284* | (2016.01) | |
| *H01M 8/0252* | (2016.01) | |
| *H01M 8/243* | (2016.01) | |

(52) U.S. Cl.
CPC ........... *H01M 8/004* (2013.01); *H01M 8/021* (2013.01); *H01M 8/0252* (2013.01); *H01M 8/0284* (2013.01); *H01M 8/1007* (2016.02); *H01M 8/241* (2013.01); *H01M 8/243* (2013.01)

(58) Field of Classification Search
CPC .... H01M 8/004; H01M 8/1007; H01M 8/021; H01M 8/0252; H01M 8/243; H01M 8/2404; H01M 8/249
See application file for complete search history.

(56) References Cited

U.S. PATENT DOCUMENTS

| | | | | |
|---|---|---|---|---|
| 10,115,985 | B2 * | 10/2018 | Matsuo | ............. H01M 8/04231 |
| 2010/0086824 | A1 * | 4/2010 | Homel | ................ H01M 4/8626 |
| | | | | 429/406 |
| 2011/0287339 | A1 * | 11/2011 | Suh | ...................... C23C 18/1216 |
| | | | | 429/510 |
| 2014/0227623 | A1 * | 8/2014 | Kakinuma | .......... H01M 8/1213 |
| | | | | 429/465 |

* cited by examiner

*Primary Examiner* — Milton I Cano
*Assistant Examiner* — Mary G Henshaw
(74) *Attorney, Agent, or Firm* — Brinks Gilson & Lione

(57) ABSTRACT

A fuel cell array comprises a plurality of serially connected fuel cell units. A respective fuel cell unit comprises a fuel cell and a cap capped on each end of the fuel cell. The fuel cell unit further comprises an electrically conductive terminal layer forming an outermost laminate of the fuel cell at one end of the fuel cell. The terminal layer is directly laminated on a fuel electrode layer and directly laminated on a solid electrolyte layer. The fuel cell unit further comprises a glass material forming a sealing layer circumferentially around the fuel cell to fill between the inner surface of the cap and the outer surface of the fuel cell. The plurality of fuel cell units are electrically connected in series through the electrically conductive terminal layer, not through the cap.

11 Claims, 12 Drawing Sheets

FUEL CELL UNIT AND FUEL CELL ARRAY

RELATED APPLICATIONS

This application claims priority under 35 U.S.C. § 119 to Japanese Patent Application Nos. 2017-022868 filed on Feb. 10, 2017 and 2017-022869 filed on Feb. 10, 2017, the entire contents of which are hereby incorporated by reference.

BACKGROUND OF THE INVENTION

1. Field of the Invention

The present invention relates to a fuel cell unit and a fuel cell array. In particular, the present invention relates to a fuel cell unit that uses a solid oxide fuel cell to generate electricity by reforming a starting material gas to obtain a fuel gas and then by reacting the fuel gas with an oxidant gas, as well as to a fuel cell array that uses the fuel cell units.

2. Description of the Related Art

A solid oxide fuel cell (SOFC) device is an electricity-generating device that employs an oxide ion conducting solid electrolyte layer that serves as an electrolyte. A plurality of fuel cells with electrodes attached to both sides of these layers are arranged inside a module, and a fuel gas is supplied to one of the electrodes (fuel electrode) of the fuel cell, while an oxidant gas (air, oxygen, or the like) is supplied to the other electrode (air electrode), causing an electricity-generating reaction, thereby extracting electrical power generated by electricity-generating reaction. In contrast to other fuels cell devices such as polymer electrolyte fuel cell devices, solid oxide fuel cells operate at relatively high temperature on the order of 700-1,000° C.

A gas seal is typically provided in such a solid oxide fuel cell device in order to isolate the channel for supplying the fuel gas to the fuel electrodes from the channel for supplying the oxidant gas to the air electrodes. In the case of a solid oxide fuel cell device according to Patent Reference 1, wherein a plurality of cylindrical fuel cells (also referred to as a tubular fuel cells) are arranged and electrically connected, conductive caps are attached to the top ends and to the bottom ends of the fuel cells, and the device is structured so that electrical current is extracted from the fuel electrode layers of the fuel cells to outside of the fuel cells via these caps. According to this structure, the fuel gas is supplied to an internal flow channel of each of the fuel cells from the fuel gas flow-through ports of the caps attached to the bottom ends of the fuel cells. On the other hand, residual fuel gas that does not contribute to the generation of electricity, as well as water vapor produced by the electricity-generating reaction (collectively off-gasses), are discharged from the gas flow-through ports of the caps attached to the top ends of the fuel cells, and these are simultaneously mixed with air and combusted. The resulting combustion exhaust gas is discharged from the top of the modules.

The end structure of the tubular fuel cell of Patent Reference 1 had a problem in that if the fuel gas leaks to the outside, without passing through the fuel gas flow-through port of the cap, hydrogen in the leaked fuel gas reduces the air electrode located on the outside of the fuel cell, causing a degradation of performance. Therefore, in Patent Reference 1, in order to prevent leakage of fuel gas (hydrogen) to the air electrode side, an air-tight seal is formed using a dense material (glass) in addition to a silver seal for providing a conductive connection between the fuel cell and the cap.

PRIOR ART REFERENCES

Patent References

Patent Reference 1: WO2013/047667
Patent Reference 2: Japanese Patent Application Kokai Publication No. 2011-99159

SUMMARY OF THE INVENTION

Problems to be Solved by the Invention

However, it was found that even if an air-tight seal is formed between the cap and the fuel cell by using a dense material such as glass, there is a risk that a minute quantity of oxygen from outside of the fuel cell may pass through the dense material and penetrate into the interior space of the cap that is partitioned by the cap.

Because the above-described solid oxide fuel cell device operates in high-temperature environments on the order of 700-1,000° C., it is difficult to avoid using silver or conductive materials having silver as the primary constituent, from the standpoint of conductive performance in conductive connections between the fuel cells and the caps, as well as from the overall standpoints of thermal resistance, oxidative resistance, flexibility, strength, and the like. However, if oxygen passes through a dense material such as glass, the oxygen also passes through the silver material, and reacts with the hydrogen that passes from the fuel gas into the silver material, resulting in forming water vapor in the silver material. Formation of this water vapor causes the silver material to become porous and expand. In continuous operation of the fuel cell device, the expansion becomes great, and the air-tight seal breaks, forming a leakage channel for the fuel gas that contains hydrogen. As a result, degradation of the air electrode is promoted by a reductive effect of the leaked hydrogen, and a further decrease in durability of the fuel cell is ensued.

Given that the device operates in high-temperature environments, coefficients of linear expansion of components of the fuel cell device are made close to each other as much as possible to suppress the creation of thermal stress that could occur due to differences in the coefficients of linear expansion. However, with regard to the connecting structure of the fuel cells, which is the heart of the fuel cell device, and the collectors (caps) that extract electrical power from the fuel cells, even if it is possible to select structural materials so that the coefficients of linear expansion of the fuel cells, collectors, and gas seals are close in value, differences in the coefficients of thermal expansion occur in the silver materials that connect the fuel cells and the collectors. Accordingly, membrane peeling and the like occur because of the resulting thermal stress, and there is a risk of failure of the fuel cells.

The present invention provides a highly durable fuel cell unit using a tubular fuel cell that employs a silver material to support a structure for extracting electrical current at elevated temperatures, and that suppress leakage of fuel gas that could be caused by using the silver material.

Means for Solving these Problems

In one embodiment of the present invention, the fuel cell unit comprises a tubular fuel cell that generates electricity by means of a fuel gas and an oxidant gas, and tubular caps each having an opening for covering an end portion of the fuel cell, a flow-through port for the fuel gas formed in a top surface or a bottom surface of the cap. The fuel cell has a fuel electrode layer provided with an internal flow channel that permits the fuel gas to flow in the longitudinal axial direction of the fuel cell, a solid electrolyte layer disposed on the outer side of the fuel electrode layer, and an air electrode layer disposed on the outer side of the solid electrolyte layer. On at least one end portion of the fuel cell, there is provided a terminal layer, having silver as its primary component, on the outer side of an area of the solid electrolyte layer that is not covered by the air electrode layer. The cap has an anchoring portion, around the entire side surface circumference of the fuel cell, immobilized by a glass on the terminal layer. The terminal layer has a fuel electrode layer connection zone defined within cap being into electrical contact with an area of the fuel electrode layer that is not covered by the solid electrolyte layer and located further inside the cap than the anchoring portion. The terminal layer has an electrical current extraction zone that extends to the outside beyond the opening of the cap.

In a collector structure that extracts electrical current from a fuel cell via metallic caps provided at the ends of fuel cells, a silver material such as a silver wax or a silver paste is embedded between the cap and the fuel cell, in order to electrically connect the caps and the electrodes positioned on the side surface of the fuel cell. However, because the silver material allows oxygen present outside of the fuel cell and hydrogen present inside the cap to infiltrate, water vapor forms inside the silver material, so the glass forms an air-tight seal in the vicinity of the opening of the cap, so as to prevent the penetration of oxygen into the silver material.

However, even though glass is used, which is a typical material used as a sealing and immobilizing material in the prior art, there was a risk that a reliable air-tight seal for oxygen is impossible because of a variety of conditions such as the constituent materials and their composition, the degree of crystallinity, and the like. If there is infiltration even of minute quantities of oxygen, the formation of a large number of pores in the silver material progressed gradually over a long period of time, so it became evident that there was a problem of durability that would gradually result in failure of the fuel cell. In addition to this problem, there was also an inherent problem in that the surrounding structure that included the silver material would degrade due to thermal stress resulting from a difference in the coefficient of thermal expansion of the silver material and the coefficients of expansion of the surrounding materials.

The above problems are both caused by the prior art structure that assumes a collector structure depending on a cap, in which a large quantity of (thick-film) silver material is provided between the cap and the fuel cell to facilitate conductivity between the cap and the cell electrode.

Accordingly, the present inventors have departed from the prior art collector structure depending on a cap and adopted an entirely new collector structure not depending on a cap by employing a novel thin-film silver terminal layer that exhibits very low pore-forming effect. This made it possible for the present inventors to achieve a fuel cell unit having high durability, while using silver to ensure conductivity.

In this specification, a "tubular fuel cell" is a fuel cell having a three-dimensional shape elongated in one direction (a longitudinal axial direction), and which includes a configuration provided with an internal flow channel that allows a fuel gas to flow through it in the longitudinal axial direction. This includes, for example, three-dimensional shapes such as a cylinder, a flattened cylinder, or the like. A plurality of internal gas flow channels may be provided.

In this specification, "having silver as the primary constituent" means containing silver to an extent that will impart a conductive function at least to the terminal layers, and excludes unintended admixtures of impurity levels. Alloys such as AgPd (silver-palladium) are included, for example, and pure silver that is substantially only silver, is also included.

In this specification, a "fuel electrode layer" not only includes a fuel electrode catalyst layer that forms hydrogen ions from the supplied fuel gas containing hydrogen, by using a metallic catalyst containing Ni or the like, but also includes a supporting member for forming a functional layer such as the fuel electrode catalyst layer.

In this specification, a "fuel electrode layer connection zone" refers to a zone defined within the cap where the terminal layer is brought into electrical contact with the fuel electrode layer that is not covered by the solid electrolyte layer that is located further inside in the cap than the anchoring portion. This zone may be a side surface of a fuel cell, or it may be an end surface (top or bottom) of the fuel cell.

In this specification, a "fuel cell unit" includes a single fuel cell with parts such caps being attached integrally.

In an embodiment of the present invention, the terminal layer has a film thickness preferably thinner than that of the glass.

According to this embodiment, since the terminal layer having silver as the primary constituent is made thin enough, it is possible to minimize the risk of leakage of fuel gas to the air electrode side when the formation of a large number of pores occurs, and this also makes it possible to enhance the durability of the fuel cell unit.

In an embodiment of the present invention, it is advantageous for the terminal layer to contain chemical elements that mutually diffuse into the solid electrolyte layer.

According to this embodiment, the adhesion between the terminal layer and the solid electrolyte layer is improved and thus they are prevented from peeling apart.

In an embodiment of the present invention, it is advantageous for at least the fuel electrode connection zone of the terminal layer to contain chemical elements that mutually diffuse into the fuel electrode layer.

According to this embodiment, the adhesion between the terminal layer and the fuel electrode layer is improved and thus they are prevented from peeling apart.

In an embodiment of the present invention, it is advantageous to have a peeling prevention layer between the exposed solid electrolyte layer and the terminal layer.

It is generally known that there is not necessarily good adhesion between the silver material and the solid electrolyte layer. For this reason, there is a risk of peeling between the terminal layer and the solid electrolyte layer at the adhesion boundary, because of expansion and contraction of the fuel cell that accompanies repeated operation of the fuel cell device. According to this embodiment, peeling is inhibited by raising the adhesion strength, thus making it possible to enhance durability.

In an embodiment of the present invention, a peeling prevention layer preferably has glass as its primary constituent.

According to this embodiment, since the peeling prevention layer is made of glass which has the coefficient of linear expansion close in value to silver and functions as an insulating material, peeling of the silver material from the solid electrolyte layer can be prevented.

In an embodiment of the present invention, it is advantageous for the peeling prevention layer to extend to outside from the electrical current extraction zone of the terminal layer in the longitudinal axial direction of the fuel cell, so that the peeling prevention layer has an end portion not covered by terminal layer.

According to this embodiment, electrical shorting, which could occur between the terminal layer that is electrically connected to the fuel electrode layer and the collector layer that is electrically connected to the air electrode layer, resulting from dendrite crystals that develop due to the migration of the silver contained in the terminal layer, is prevented.

Moreover, in an embodiment of a fuel cell array according to the present invention, the fuel cell unit is electrically connected to an air electrode layer of an adjacent fuel cell unit, via a connector member that is electrically connected to a current extraction zone.

According to this embodiment, it becomes possible to electrically connect the fuel cell unit by means of the connector member alone, rather than via a prior art cap. Accordingly, extraction efficiency can be improved, because it is possible to eliminate a connection resistance component due to mediation of the cap.

In this specification, a "connector member" is a conductive member used to electrically connect the fuel electrode layer of one fuel cell unit with the air electrode layer of another adjacent fuel cell unit, and thus differs from the terminal layer described above. The connector member is not necessarily a single member (1 part), and it may be formed from a plurality of members, as long as it fulfills the function of electrical connection described above. It may also separately serve other functions, as long as it electrically connects the air electrode layer to the electrical current extraction zone (fuel electrode collection zone).

In this specification, a "fuel cell array" is an assembly of a plurality of fuel cells that are physically anchored by at least a connecting and anchoring means such as a collector and a sealing material. For example, such an assembly can include the entirety of a plurality of fuel cells that are arrayed and anchored on a fuel gas manifold for temporarily storing and then distributing and supplying a fuel gas to the fuel cells.

On the other hand, in the case of the prior art tubular fuel cell, electrical current is extracted via a metallic cap provided at an end portion of the fuel cell. Patent Reference 1 discloses a plurality of serially connected fuel cells, wherein cup-shaped (cylinders with bottoms) caps (also known as collector caps or conductive caps) are attached respectively to parts that expose the fuel electrode layers of both ends of the tubular fuel cells, and the caps are electrically connected to air electrode layers of adjacent fuel cells.

Conventionally, the inventors employed materials for the caps, such as Cr (chromium)-containing ferritic stainless steel (an alloy having as its primary constituents at least Fe and Cr; also referred to as SUS) for high-temperature oxidation resistance. However, the cup containing, as a substrate, stainless steel containing Cr tends to develop what is known of as the problem of Cr contamination of the air electrodes, in which a chromia ($Cr_2O_3$) layer is formed on a surface of the caps, and as Cr evaporates from the chromia layer, oxides such as LSCF (La—Sr—Co—Fe perovskite composite oxide) adhere to a surface of the air electrode layers, thereby inducing degradation of the catalytic performance of the air electrodes.

As a means to counter Cr contamination, a MnCo oxide layer film is formed on the surface of the caps to limit the amount of diffusion to the air electrodes due to evaporation of Cr. Patent Reference 2 discloses the coating of surfaces of SUS interconnectors with $MnCo_2O_4$ to inhibit Cr contamination of air electrodes.

However, it is very difficult to form MnCo oxides in a dense form, and even if a MnCo oxide film is formed, it is difficult to completely prevent Cr from evaporating unless the MnCo oxide film is formed in a sufficiently dense form. Accordingly, means were sought for increasing the density of MnCo oxides, or in the alternative, to sufficiently inhibit Cr evaporation.

An embodiment of a fuel cell unit according to the present invention comprises a tubular fuel cell that generates electricity by reacting a fuel gas and an oxidant gas, and a cylindrical cap with a bottom covering at least one end of the fuel cell. The fuel cell unit has a power-generating element formed from a fuel electrode layer provided with an internal flow channel that permits the fuel gas to flow in the longitudinal axial direction of the fuel cell, a solid electrolyte layer disposed on an outer side of the fuel electrode layer, and an air electrode layer laminated on an outer side of the solid electrolyte layer. The cap is formed from stainless steel containing aluminum with an insulating film formed on its surface. A fuel electrode collector zone capable of electrically connecting to the fuel electrode layer is provided in the longitudinal axial direction of the fuel cell around the entire side circumference of the fuel cell between the power-generating element and one end of the fuel cell covered by the cap.

In the solid oxide fuel cell laminated with a ceramic material, because the fuel cell formed in a cylindrical shape has a circular cross-section perpendicular to the central axis, when a starting material gas is supplied to the inside or outside of the fuel cell, not only is it possible to achieve a uniform electricity-generating reaction at the entire side surface, but also, expansion and contraction occur isotropically, so the shape is comparatively superior to other shapes from the standpoint of durability.

On the other hand, because all of the side surfaces of the tubular fuel cell are curved, some ingenuity was required to devise a collector structure that activates uniform electricity-generating reactions at all side surfaces. Thus, in the past, methods were used for extracting electrical current via metallic caps provided at the end portions of cells, in order to collect electricity from tubular fuel cells. In addition, stainless steel was selected for the cap material in order to use them at elevated temperatures on the order of 700° C. However, as described above, it is known that the Cr contained therein forms a chromia ($Cr_2O_3$) layer on the surface of the caps, the Cr evaporates therefrom and reacts with the air electrode (Cr contamination), thereby inducing degradation of the catalytic performance of the air electrodes. Accordingly, as a means to counter Cr contamination, a coating of MnCo oxide was applied to the surface of the caps to reduce the amount of Cr evaporation, but it is difficult to increase the density of the coated MnCo oxide, so there was a limit to the extent to which Cr evaporation could be inhibited.

On the other hand, in a fuel cell array employing tubular fuel cells, the caps function to anchor the lower end of the fuel cells on a manifold, and they also function to regulate the amount of off-gas discharge when combustion is carried out in a combustion chamber above the caps. For that reason, it is difficult to build a fuel cell array without caps.

Moreover, in the prior art collector structure, wherein fuel cell electrode current was collected via caps coated with a MnCo oxide, since the surface of the air electrode layer was disposed close to the caps, which are the source of Cr evaporation, in order to ensure a sufficient surface area on the power-generating element, an air electrode layer is structurally easily susceptible to Cr contamination.

Accordingly, the inventors first conceived of using stainless steel containing aluminum (Al) in addition to Cr in the substrate of the cap. As discussed later, it was experimentally confirmed that it is possible to greatly lower the amount of Cr evaporated from the substrate of the caps, because stainless steel containing Al forms a passive state film containing Al ($Al_2O_3$) on the surface. On the other hand, because passive state films containing Al have high insulation properties if stainless steel containing Al is used in the cap substrates, it becomes difficult to adopt a prior art collector structure of a fuel cell that relies on a conductive cap.

Therefore, the inventors devised the collector structure according to the present invention in which a cap is formed of stainless steel containing aluminum having a passive state film capable of significantly lowering Cr evaporation to inhibit the formation of Cr contamination while forming a terminal layer on the fuel electrode layer, not relying on the insulated caps.

The embodiment of the present invention eliminates the problem of Cr contamination of the air electrode layers caused by Cr evaporation from the caps, and at the same time makes it possible to extract electrical current from the fuel electrode layers without utilizing insulated caps. Moreover, because the collector structure according to the present invention has a fuel electrode collection zone disposed between the caps and the exposed air electrode layers serving as a power-generating element, this structure separates the caps from the air electrode layers. Thus, even if a minute quantity of Cr were to pass through the stainless steel containing aluminum, it can be prevented from reaching the air electrode layers.

Accordingly, this embodiment of the present invention is able to provide a highly durable fuel cell unit, which is achieved by completely eliminating the effects of Cr contamination by securing a route for electricity collection.

In an embodiment of the present invention, it is advantageous for the insulating film to be formed on the entire surface of the cap.

According to this embodiment, since an insulating film is formed on the entire surface of the cap, it is possible to ensure an inhibiting effect on Cr evaporation on the entire surface of the cap. The insulating film that is formed on the surface of the cap can be a passive state film containing Al formed by natural occurrence in the manufacturing process. In the alternative, the insulating film can be an insulating film formed at a target film thickness in such a manner that after the passive state film containing Al is removed, it is heated through a heating process employed in an oxygen environment.

In this specification, "entire surface of the cap" means the entire surface containing the outer side surface and the inner side surface of the bottomed cylindrical cap.

In an embodiment of the present invention, the film thickness of the insulating film is preferably 0.1 µm or greater.

The film thickness of a passive state film formed naturally in air is very thin, typically several nm to several 10 nm. By contrast, according to this embodiment, the caps are covered with an insulating film of a specified thickness, thereby making it possible to reduce the amount of Cr evaporating from the cap material to an extremely low level.

In a fuel cell array according to an embodiment of the present invention, the fuel cell array is formed by electrically connecting the fuel cell unit to the air electrode layer of an adjacent fuel cell unit, via a connector member connected to the fuel electrode collector zone.

According to this embodiment, because the fuel cell unit can be electrically connected only with the terminal layer, without relying on the prior art caps, connection-resisting components that are caused by using caps can be eliminated, thus making it possible to enhance the efficiency in extracting electrical current. In addition, short-circuiting due to contact among the caps no longer occur between the fuel cells, thus making it possible to narrow the intervals between adjacent fuel cell units so as to achieve a higher level of integration.

Advantageous Effects of the Invention

In a fuel cell unit employing tubular fuel cells, it is possible to provide a highly durable fuel cell unit that has reduced leakage of fuel gas, while using silver to secure conduction.

DETAILED DESCRIPTION OF THE PREFERRED EMBODIMENTS

Embodiments of the invention disclosed in this specification will hereinafter be discussed with reference to the accompanied drawings. Based on the descriptions below, many improvements and other embodiments of the present invention are obvious to any person skilled in the art. Therefore, the following descriptions are to be interpreted only as examples, and these have been provided for the purpose of teaching to persons skilled in the art the preferred embodiments for implementing the present invention. The details of structure and/or function thereof can be substantively modified without deviating from the spirit of the present invention.

The First Embodiment

Figure 1:
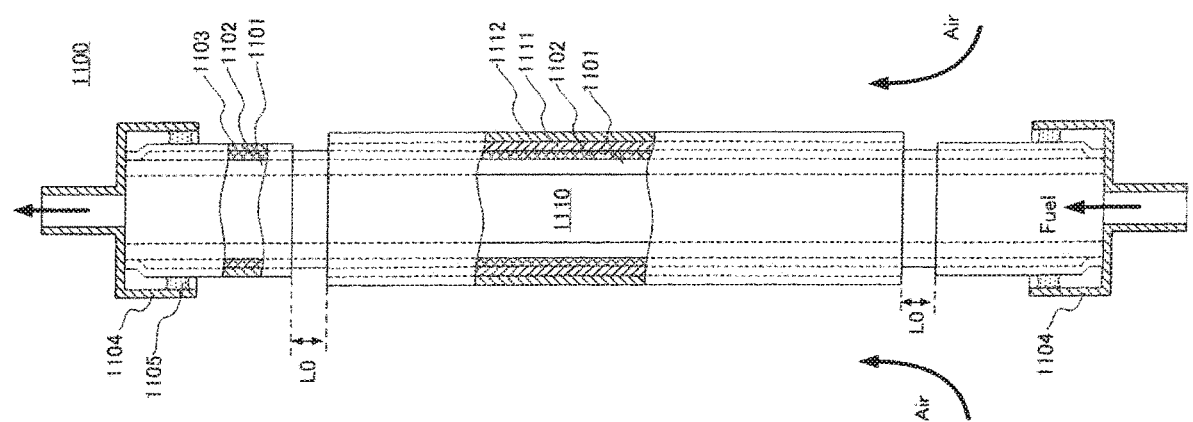
FIG. 1 is a partial sectional view of a fuel cell unit in an embodiment of the present invention.

FIG. 1 is a partial sectional view illustrating the over-all configuration of a fuel cell unit according to an embodiment of the present invention. In FIG. 1, a fuel cell unit 1100 has a fuel cell and a cap 1104 provided respectively at the upper end and the lower end of the fuel cell. The cap 1104 may be constructed to be provided at only one end of the fuel cell unit 1100.

The fuel cell has a tubular construction extending in a vertical orientation (a longitudinal axial direction), and is formed in a cylindrical shape with a circular horizontal cross-section. A fuel electrode layer 1101 inside the tubular fuel cell has an internal flow channel 1110 that allows a fuel gas to flow through in a longitudinal axial direction. In addition to the above-described shape, the tubular may be such that the contour in a horizontal cross-section is elliptical or rectangular having R at angular portions. The internal flow channel 1110 is not limited to one, and there may be a plurality thereof.

The fuel cell has at least the fuel electrode layer 1101, a solid electrolyte layer 1102 disposed on an outer side of the fuel electrode layer, and an air electrode layer 1111 disposed on an outer side of the solid electrolyte layer. There is also provided a highly conductive collector layer 1112 on an outer surface of the air electrode layer 1111, and moreover, the air electrode layer 1111 is not provided in both end portions of the fuel cell, and a highly conductive terminal layer 1103 is formed on exposed outer surfaces of the fuel electrode layer 1101 and the solid electrolyte layer 1102.

The fuel electrode layer 1101 can be formed from at least one of (i) a mixture of zirconia doped with at least one species selected from Ni, Ca and Y, and a rare-earth element such as Y, Sc, or the like, (ii) a mixture of ceria doped with at least one species selected from Ni and a rare-earth element, and (iii) a mixture of lanthanum gallate doped with Ni and at least one species selected from Sr, Mg, Co, Fe, and Cu. For example, the fuel electrode layer 1101 may be Ni/YSZ.

The fuel electrode layer 1101 of this specification as described above shall be considered to include a fuel electrode catalyst layer and a supporting member. For example, the fuel electrode layer 1101 may be a laminated member consisting of a conductive supporting member and a fuel electrode catalyst layer formed on the outer surface thereof, and it may also be a laminated member consisting of an insulating supporting member and a fuel electrode catalyst layer formed on the outer surface thereof. It may also have a laminate structure that includes a separately provided intermediate layer and a concentration gradient layer to enhance functionality and durability of the fuel electrode.

Likewise, the solid electrolyte layer 1102 and the air electrode layer 1111 may also have a laminate structure that includes a separately provided intermediate layer and a concentration gradient layer to enhance the functionality and durability thereof.

The solid electrolyte layer 1102 is formed across the entire outer circumference surface of the fuel electrode layer 1101. The lower end of the solid electrolyte layer 1102 terminates so as to fall short of the lower end of the fuel electrode layer 1101, and the upper end of the solid electrolyte layer 1102 terminates so as to fall short of the upper end of the fuel electrode layer 1101. The solid electrolyte layer 1102 can be formed from at least one of zirconia doped with at least one rare-earth element such as Y, Sc, or the like, (ii) ceria doped with at least one species selected from the rare-earth elements, and (iii) lanthanum gallate doped with at least one species selected from Sr and Mg, for example.

The air electrode layer 1111 is formed across the entire outer circumference surface of the solid electrolyte layer 1102. The lower end of the air electrode layer 1111 terminates so as to fall short of the lower end of the solid electrolyte layer 1111, and the upper end of the air electrode layer 1111 terminates so as to fall short of the upper end of the solid electrolyte layer 1101. The air electrode layer 1111 can be formed from at least one of (i) a lanthanum manganite doped with at least one species selected from Sr and Ca, (ii) a lanthanum ferrite doped with at least one species selected from Sr, Co, Ni, and Cu, (iii) a lanthanum cobaltite doped with at least one species selected from Sr, Fe, Ni, and Cu, or silver, for example.

The fuel electrode layer 1101 functions as a (−) electrode for the fuel gas to flow through to the above-mentioned internal flow channel, and the air electrode layer 1111 functions as a (+) electrode that makes contact with the air (oxidant gas) supplied from the outside of the fuel cell unit 1100 (see the arrows in FIG. 1).

In the embodiments of the present invention, the air electrode layer 1111 and the collector layer 1112 on the outer surface thereof extend from the center across toward the end portions in the axial orientation of the fuel cell, while terminating at a predetermined distance from an end portion of the fuel cell at both ends of the fuel cell. The zone in which the air electrode layer 1111 is formed functions as a power-generating element 1115 having the fuel electrode layer 1101 and the solid electrolyte layer 1102 laminated on the inner side thereof. The terminal layer 1103 is provided on an outer surface of the fuel electrode layer 1101 and the solid electrolyte layer 1102 in both end portions of a fuel cell in which the air electrode layer 1111 and the collector layer 1112 above it are not formed.

The terminal layer 1103 is a thin film formed from a conductive material having silver as its primary constituent. The film thickness may be suitably designed for the current extraction efficiency of the fuel cell unit 1100, with the resistance components of the conductive pathway taken into consideration. However, as mentioned above, when water vapor is formed in the silver material, it becomes porous and expands, thus forming a leakage pathway for the fuel gas, so the terminal layer 1103 should be thin in order to reduce this effect as much as possible. The terminal layer 1103 is advantageously at least thinner than a glass 1105 that anchors the cap 1104 and the fuel cell, and specifically, its thickness should be at least 1 µm and no greater than 100 µm.

The terminal layer 1103 may be pure silver, but it may be a material containing other elements, such as an alloy layer such as an AgPd film. Moreover, the terminal layer 1103 may contain elements that mutually diffuse into the solid electrolyte layer 1102, or elements (such as Ni) that mutually diffuse into the fuel electrode layer 1101. By containing elements that mutually diffuse into other layers, it becomes possible to enhance the bonding strength with other layers.

Yet further, in a site where the terminal layer 1103 is formed from a single layer, and the terminal layer 1103 connects to the fuel electrode layer 1101 (the fuel electrode connection zone 1108 shown in FIG. 2), it may have a laminate structure with another layer containing silver as the primary constituent and containing other elements that mutually diffuse into the fuel electrode layer 1101, or in the site, the terminal layer 1103 may have another single layer structure having silver as the primary constituent containing elements that mutually diffuse into the fuel electrode layer 1101.

As shown in FIG. 1, because the collector layer 1112 and the terminal layer 1103 are separated at a predetermined distance L0 in the longitudinal axial direction of the fuel cell, they are electrically insulated and isolated from each other. In FIG. 1, the separation distance is set equal to the predetermined distance L0 in both upper end and lower end portions of the fuel cell, but the separation distance may be set different from each other in the upper and lower end portions, from the standpoint of design such as the attaching configuration of the collectors or adjusting the resistance values of the conductive pathway.

In the fuel cell unit according to this embodiment of the present invention, because the collector layer 1112 connected to the outer surface of the air electrode layer 1111 and the terminal layer 1103 connected to the outer surface of the fuel electrode layer 1101 form a collector structure that electrically connects to an adjacent fuel cell unit 1100 by electrically connecting to respective collector materials. In detail, the collector layer 1112 that is connected to the outer surface of the air electrode layer 1111 is connected via the connector member to the terminal layer that is connected to the outer surface of the fuel electrode layer of an adjacent fuel cell unit. The terminal layer 1103 that is connected to the outer surface of the fuel electrode layer 1101 is electrically connected to the terminal layer that is connected to the outer surface of the air electrode layer of another adjacent fuel cell unit. Such connections make it possible to achieve serial electrical connection of a plurality of fuel cell units 1100. However, the electrical connection configuration of the fuel cell unit 1100 according to this embodiment of the present invention is not limited thereto, and the connector members may be used to connect a plurality of fuel cell units 1100 in parallel. It is also possible to structure any desired collector configuration by combining serial and parallel connections.

Accordingly, in the fuel cell unit 1100 according to this embodiment of the present invention, the zone where the air electrode layer 1111 is provided functions as the power-generating element 1115 that generates power by an electricity-generating reaction, and both ends thereof function as an electrical current extraction section (a fuel electrode collector zone 1109) on the fuel electrode layer side for exposing as the outermost surface an electrical connection terminal of the fuel electrode layer 1101 that is positioned internally. When such a configuration is employed, it is possible to arrange the electrical connection terminal for the fuel cell layer 1101 and the air electrode layer 1111 on the outermost surface of the fuel cell, thus making it possible to achieve an electrical current extraction structure that does not operate via the cap 1104.

Accordingly, the fuel electrode collector zone 1109 may have its length set at 1 mm or more in the longitudinal axial direction of the fuel cell unit 1100, and preferably at 2 mm or more. Providing a sufficient length makes it possible to secure a margin for arranging the electrical connection terminal.

The fuel cell unit 1100 has the cap 1104 attached at both ends thereof. The cap 1104 has a cylindrical shape covering both ends of the tubular fuel cell. It has a hollow structure having a side surface and a top surface or a bottom surface, and having an opening at an end opposite to the top surface or the bottom surface. A flow-through port for the passage of fuel gas is provided on the side surface or bottom surface of the cap 1104. The port functions as a fuel gas inlet port in the cap 1104 installed at the lower end of the fuel cell, and functions as an off-gas exhaust port in the cap 1104 installed at the upper end of the fuel cell.

In the fuel cell unit 1100, fuel gas containing hydrogen is supplied to the internal flow channel 1110 via the flow-through port of the cap 1104 provided at the lower end of the fuel cell unit 1100. The fuel gas containing hydrogen is supplied to the fuel electrode layer 1101 via the internal flow channel 1110, and is consumed in an electricity-generating reaction with an oxidant gas supplied to the air electrode layer 1111 from the outside of the fuel cell unit 1100. Residual fuel gas that is not used in the electricity-generating reaction and off-gas such as water vapor and CO (carbon monoxide) generated by the electricity-generating reaction rise in the internal flow channel 1110, and are discharged to the outside from the upper end of the fuel cell unit 1100 via a flow-through port of the cap 1104 disposed at the upper end of the fuel cell unit 1100.

The cap 1104 has a main body formed from ferritic stainless steel or austenitic stainless steel with the inner circumferential surface and the outer circumferential surface coated with a chromium oxide ($Cr_2O_3$ in this embodiment), and the outer circumferential surface can further be coated with $MnCo_2O_4$ in order to prevent the evaporation of chromium to the outside of the fuel cell unit 1100.

However, in this embodiment according to the present invention, stainless steel containing aluminum with an insulating film formed on the surface thereof is used in a material of the cap 1104. In this configuration it is possible to suppress Cr from evaporating to the outside of the fuel cell unit 1100, making it possible to prevent Cr contamination of the air electrode layer. In addition, the fuel electrode collector zone 1109 is formed to separate the cap 1104 and the air electrode layer 1111 to thereby make it possible to further suppress contamination of the air electrode layer 1111 by Cr in the cap.

Particularly in the cap 1104 shown in FIG. 1, the outer diameter on the end side facing the opening is made small. In other words, it is designed with a shape having a small diameter (cap small diameter part) so the cap diameter reduces. The cap 1104 positioned at the lower end of the fuel cell unit 1100 makes it possible to ensure good anchoring and attachment to a fuel gas manifold for anchoring the fuel cell unit 1100, as well as to equalize the flow amounts of fuel gas supplied to the internal flow channel 1110. Moreover, the cap 1104 positioned at the upper end of the fuel cell unit 1100 enables equalization of the flow amounts of the off-gas, so that a plurality of fuel cell units 1100 can be arranged to stabilize combustion in the combustion units for burning off-gas at the upper portion.

The end part structure of the fuel cell unit 1100 according to this embodiment of the present invention will be explained with reference to FIG. 2 and FIG. 3.

Figure 2:
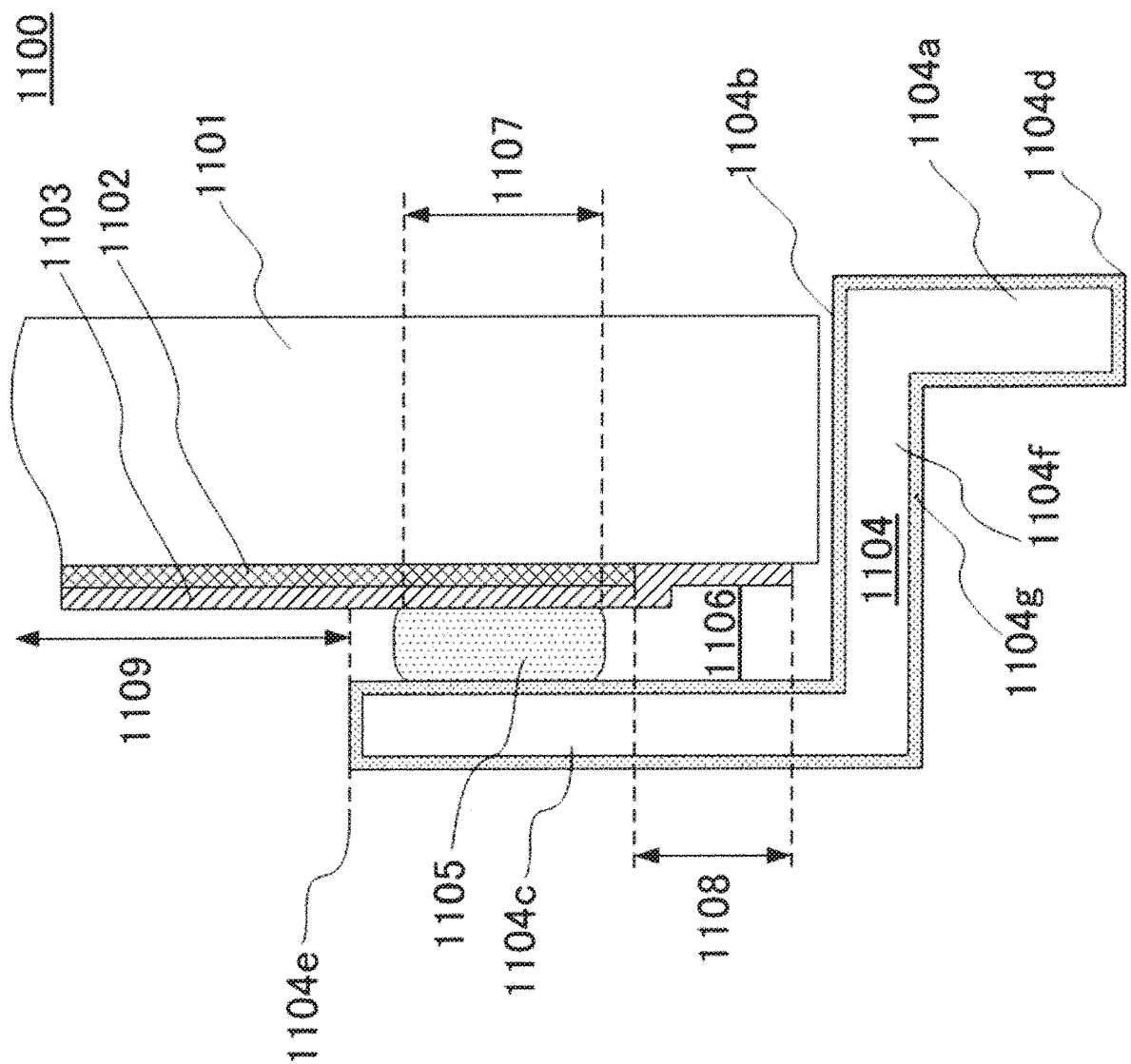
FIG. 2 is a partial sectional view of an end portion in an embodiment of the present invention.
Figure 3:
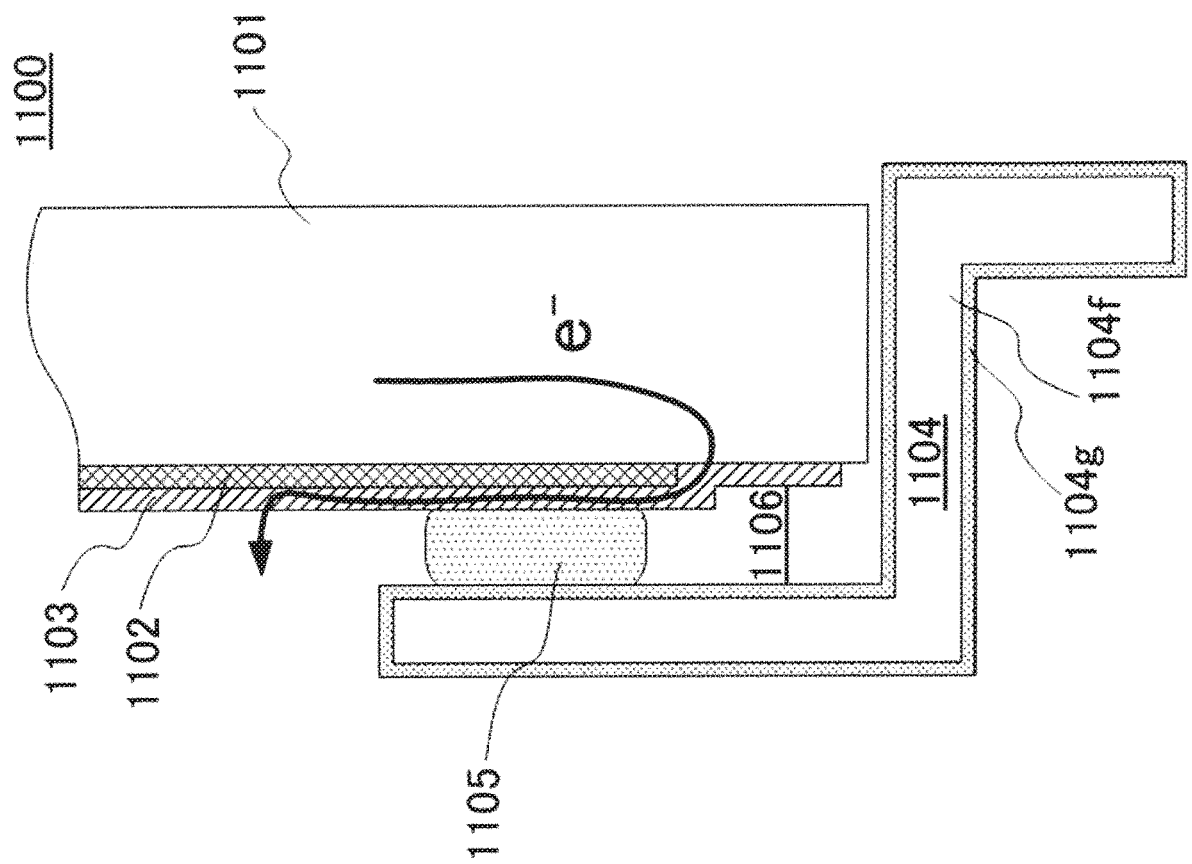
FIG. 3 is a partial sectional view of an end portion in an embodiment of the present invention.

FIG. 2 is a partial sectional view of the structure of an end portion of the fuel cell unit 1100 in an embodiment of the present invention. FIG. 2 is a drawing illustrating the lower end portion of the fuel cell unit 1100, but the structure of the upper end portion is identical.

A fuel cell formed from the fuel electrode layer 1101, the solid electrolyte layer 1102, and the air electrode layer 1111 is covered by the cap 1104 at the lower end thereof. The air electrode layer 1111 is not provided at the lower end of the fuel cell, and the solid electrolyte layer 1102 is exposed. Moreover, the solid electrolyte layer 1102 is not disposed in a zone at a predetermined distance from the end portion of the fuel cell, so the fuel electrode layer 1101 is exposed. The terminal layer 1103 is provided to cover the outer surface of the exposed fuel electrode layer 1101 and the solid electrolyte layer 1102.

In the embodiment illustrated in FIG. 2, the terminal layer 1103 is provided on the surface of the fuel electrode layer 1101 and the solid electrolyte layer 1102, in other words, on the side surface of the fuel cell. However, the embodiment is not limited thereto, and the terminal layer 1103 may extend to the bottom surface of the fuel cell and connect to the fuel electrode layer 1101 and the terminal layer 1103 at the bottom surface of the fuel cell. In this case, if the fuel electrode layer 1101 and the terminal layer 1103 are connected at the bottom surface as well as the side surface of the fuel cell, it enhances the conductivity that accompanies the increased connection surface area, and contributes to enhanced adhesion. On the other hand, if a structure is formed in which the fuel electrode layer 1101 and the terminal layer 1103 are connected only at the bottom surface of the fuel cell, and the solid electrolyte layer 1102 is extended to cover the end of the fuel cell, an electricity-collection pathway is secured, while a migration pathway of the fuel gas to an anchoring portion 1107 is kept at a distance from the internal flow channel, and thus it becomes possible to suppress the formation of a large number of pores in the terminal layer 1103 located in the anchoring portion 1107.

Because the solid electrolyte layer 1102 is a dense ceramic material in which almost no electrical current can flow, the fuel electrode layer 1101 is electrically connected to the terminal layer 1103 in a fuel electrode layer connection zone 1108 at an end portion of the of the exposed fuel cell, where the solid electrolyte layer 1102 is not disposed. In this manner, the terminal layer 1103 is electrically connected to the fuel electrode layer 1101 in the vicinity of the end of the fuel cell in the fuel electrode layer connection zone 1108, and also extends outwardly from an opening 1104e of the cap 1104 toward the central side in the longitudinal axial direction of the fuel cell.

The fuel cell and the cap 1104 are anchored by the glass 1105. The glass 1105 is disposed in such a manner that it makes contact with a cap inner wall surface 1104c and an outer surface of the collector 1103, thereby anchoring both of them. In this specification, this anchoring zone is referred to as the anchoring portion 1107. In FIG. 2, the anchoring portion 1107 is disposed only on the inner wall surface of the cap inner wall surface 1104c, but the glass 1105 may extend to the outside, beyond the opening 1104e of the cap 1104, and it may be arranged so as to encircle the upper portion of the cap 1104. The anchoring portion 1107 in which the glass is arranged is disposed in such a manner that it does not overlap with the fuel electrode connection zone 1108 in the longitudinal axial direction of the fuel cell, but if these zones are arranged so as to overlap, that would make it possible to save space in the longitudinal axial direction of the fuel cell, and that would also contribute to reducing the size of the fuel cell unit 1100 in the longitudinal axial direction.

The terminal layer 1103 that extends in the longitudinal axial direction toward the longitudinal center of the fuel cell facing the cap opening 1104ee and the glass 1105 forms an electrical current extraction zone (fuel electrode collection zone) 1109 on a side surface of the fuel cell unit 1100. By physically and electrically attaching a connector member at this site, an electrical current extraction structure extracting electrical current from the fuel electrode layer 1101 can be formed. That is to say, as illustrated in FIG. 3, electrons (e) formed by the electricity-generating reaction migrate to the terminal layer 1103 through the fuel electrode layer connection zone 1108, and then migrate to outside of the fuel cell unit 1100 through the electrical current extraction zone (fuel electrode collection zone) 1109.

On the other hand, because the fuel cell that is inserted into the cap opening 1104e is joined and anchored by the glass 1105, an interior space 1106 of the cap is partitioned. At the lower end of the fuel cell unit 1100, fuel gas supplied by a cap flow-through port 1104d proceeds to the internal flow channel 1110, but at the same time, it also flows into the interior space 1106 between the cap side wall 1104c and the fuel cell. If the fuel gas leaks to outside of the fuel cell unit 1100 via the interior space 1106, the fuel gas rises due to an oxidant gas the blows upward from the lower outer portion of the fuel cell unit 1100, and hydrogen in the fuel gas passes through the collector layer 1112, causing reduction and degradation of the air electrode layer 1111. For that reason, it is important to use the glass 1105 to completely shield the outside of the fuel cell unit 1100 and the interior space 1106 from each other.

However, even if the cap and the fuel cell are sealed air-tightly with a dense material such as glass, there is a risk that even a minute quantity of oxygen from outside of the fuel cell may pass through the dense material and infiltrate into the interior space 1106 partitioned by the cap. In the prior art, an electricity-collection pathway was formed through a metallic cap in order to collect electricity from the fuel electrode layer. A silver material such as silver wax or silver paste was embedded in the internal space of the cap, in order to connect the fuel electrode layer and the cap, but a large quantity of water vapor is formed in the reaction of oxygen and hydrogen that passed through the silver material, causing a large number of pores to be formed in the silver material, resulting in expansion of the silver material, and the formation of a fuel gas leakage pathway.

However, in the fuel cell unit 1100 according to this embodiment of the present invention, the terminal layer 1103 that can be formed as a thin film forms a silver material used for a conductive connection and replaces the silver material of the prior art. Thus, even if oxygen passed through from the outside, the amount that passes through is minute, and even if formation of a large number of pores progresses due to the resulting water vapor, there is very little expansion, because it is a thin film. It is therefore possible to suppress leakage of fuel gas to outside of the fuel cell unit 1100.

Accordingly, because the fuel cell unit 1100 according to this embodiment of the present invention employs a collector film having silver as its primary constituent, instead of the prior art collector structure employing a cap as an electricity-collection pathway, although the collector structure still employs silver, it is possible to reduce the risk of forming a harmful fuel gas leakage pathway, thus making it possible to increase the air-tight sealing of the fuel gas. In addition, since it is possible to reduce the amount of costly silver that is used, it is advantageous in that it can reduce the cost of the product.

We now discuss a case where the cap 1104 is formed from a cap substrate 1104f formed from a cap-forming material, and an insulating film 1104g formed so as to cover the surface of the cap substrate 1104f.

The cap substrate 1104f is formed from stainless steel (SUS) containing aluminum. Because stainless steel typically contains iron (Fe) and chromium (Cr) as its primary constituents, the cap substrate itself causes Cr contamination of the air electrode. In the present invention, the stainless steel contains aluminum. For example, a ferritic stainless steel (SUS 405) may be used that contains 11.5-14.5% Cr and 0.1-0.3% Al. A commercially available stainless steel containing aluminum may be used, such as the Nisshin Steel ferritic stainless steel NCA-1 (18Cr-3Al—Ti), the Shin-Nittetsu Sumikin ferritic stainless steel NSSC-21M (18Cr-2Al-0.5Si—Ti), or the like.

The insulating film 1104g is provided across the entire surface of the cap substrate 1104f, including the outer wall surface and the inner wall surface. The insulating film 1104g is a dense passive state film (an oxide film formed from $Al_2O_3$) formed by an oxidation reaction of aluminum in the cap substrate 1104f on the surface of the cap substrate 1104f. By forming the oxide film using oxidation in air or anodic oxidation, to film thickness of about 0.1 μm or more, makes it possible to significantly suppress evaporation of Cr from the cap substrate 1104f.

Figure 11A:
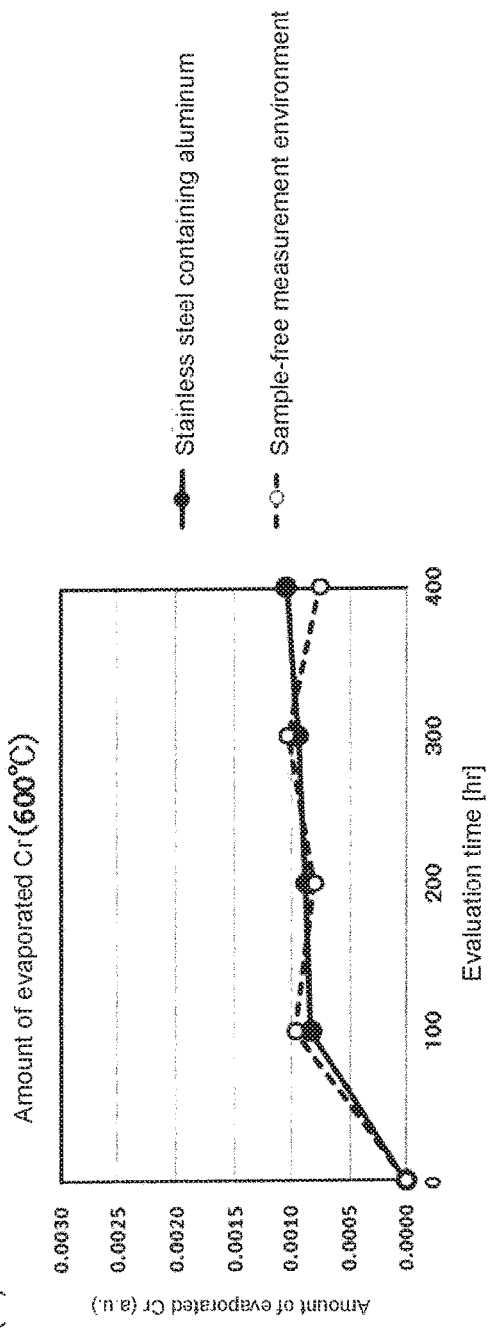
FIGS. 11A and 11B present graphs illustrating the amount of Cr vapor emitted from caps in an embodiment of the present invention.
Figure 11B:
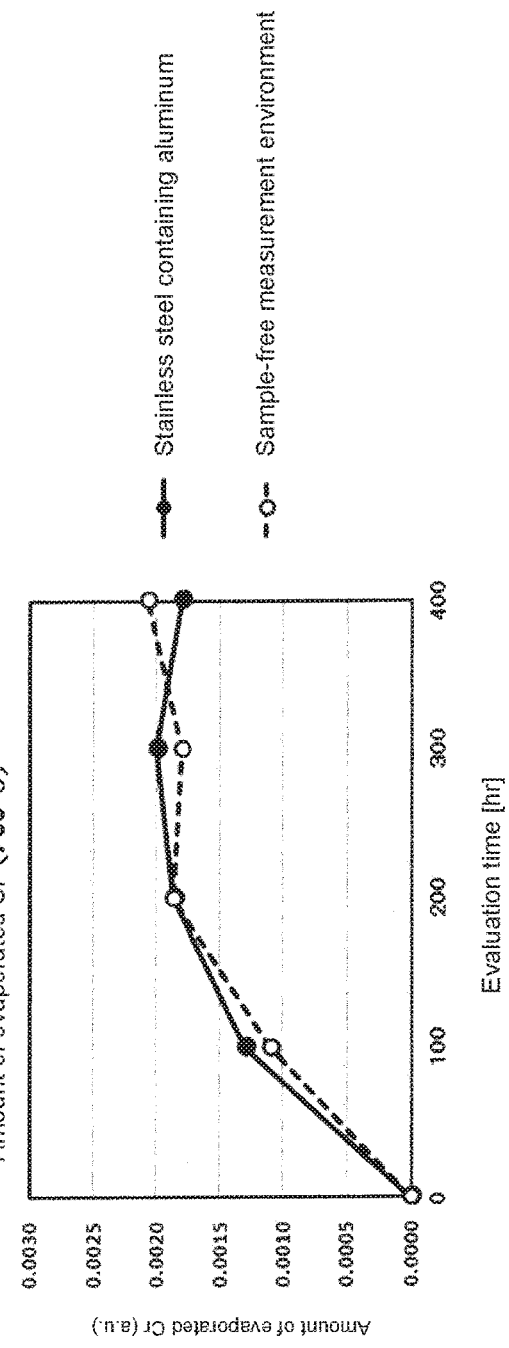

FIGS. 11A and 11B shows the results of evaluation of amounts of Cr evaporated under elevated temperatures in stainless steel containing aluminum. FIG. 11A and FIG. 11B show the amounts of Cr evaporated from stainless steel containing aluminum, where the horizontal axis gives the evaluation time, and the vertical axis gives the amount of evaporated Cr. The method of evaluating the amount of evaporated Cr involves setting up a stainless steel specimen containing aluminum in a small draft muffle furnace surrounded by an alumina cylinder, and using an x-ray fluorescence (XRF) analyzer to measure the surface of a magnesia adsorption plate installed as a top plate of the muffle furnace. Measurements were also made in cases where no specimens were set up, in order to assess the measurement environment.

FIG. 11A shows cases where the temperature within the muffle furnace was set at 600° C., and FIG. 11B shows cases where the temperature within the muffle furnace was set at 700° C. In both cases, the temperatures were set close to the electricity-generating operating temperatures of the solid oxide fuel cell. The black circles in the drawing represent the amounts of Cr evaporation from stainless steel containing aluminum, while the white circles represent the amounts of Cr evaporation resulting from measurements taken to assess the measurement environment when no specimens are present.

In FIG. 11A and FIG. 11B, the results are in substantial agreement when stainless steel specimen containing aluminum is used and when measurements are taken in environments without specimens present. Accordingly, the amount of Cr evaporation from stainless steel containing aluminum was found to be extremely low under elevated temperature conditions.

Figure 12:
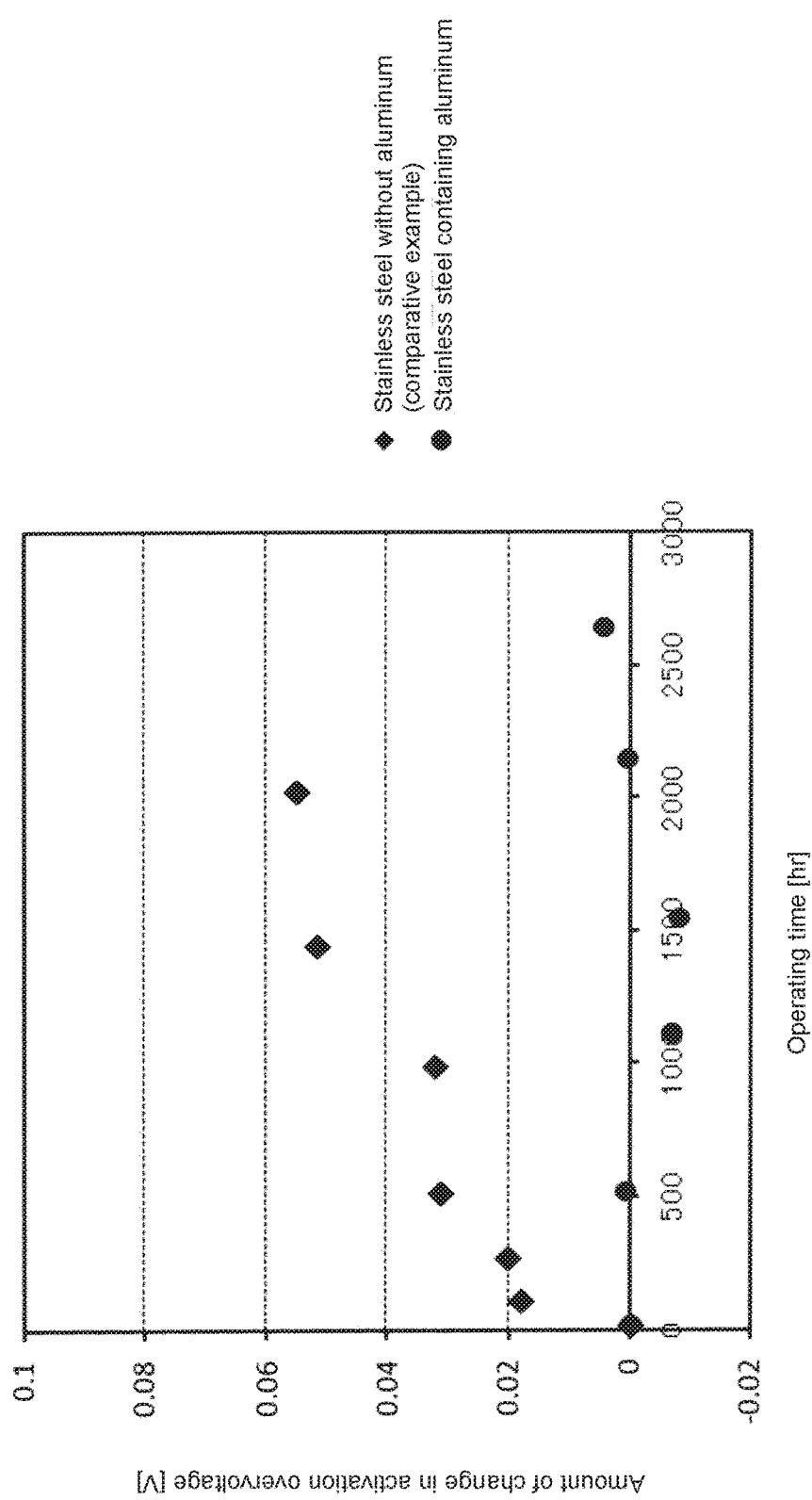
FIG. 12 is a graph illustrates degradation characteristics over time of a cell when caps are used in an embodiment of the present invention.

FIG. 12 shows the results of evaluation of durability of a fuel cell unit with a cap stainless steel containing aluminum.

FIG. 12 shows results for a fuel cell unit with a cap stainless steel containing aluminum, and for the sake of comparison, for fuel cell unit with a prior art stainless steel cap. FIG. 12 shows results for electrode reaction overvoltage, obtained under electricity-generating operating conditions, when measurements of alternating current impedance are taken over time (operating time) using a frequency response analyzer. The horizontal axis gives the operating time (unit: Hours), and the vertical axis gives the amount of change in activation overvoltage (Unit: V).

In the case of a fuel cell unit using a prior art stainless steel cap that does not contain aluminum, the amount of change in activation overvoltage increases immediately after operation starts, and then, with the passage of operating time, the amount of change in activation overvoltage increases greatly. This is thought to be due to an increased contamination effect in the air electrode layer, resulting from increased amounts of Cr that are released from the stainless steel cap with the passage of operating time.

On the other hand, using a fuel cell unit having stainless steel containing aluminum in the cap results in an amount of change in activation overvoltage that does not depend on the operating time. That is to say, it was determined that the release of Cr can be suppressed by using stainless steel containing aluminum formed on the cap as a passive state film.

In contrast to a prior art cap, when a cap that employs stainless steel substrate containing aluminum is used, the amount of Cr evaporation is dramatically decreased, thus making it possible to enhance the durability of the fuel cell unit.

Because the surface of the cap 1104 is insulated with the insulating film 1104g, it is extremely difficult to form an electricity-collecting structure via the cap, as in the prior art. However, by forming a collector structure that extracts electrical current directly, without passing through the cap 1104, to the outside from the fuel electrode collector zone 1109 disposed at the end portion of the fuel cell, it is possible to realize a viable collector structure. Moreover, by forming a structure wherein the air electrode layer 1111 physically isolates the cap 1104 from the fuel electrode collector zone 1109, evaporated Cr is prevented from adhering to the air electrode layer 1111, thereby very significantly reducing Cr contamination in the air electrode layer, thus making it possible to achieve a highly durable fuel cell unit.

In addition, because it was necessary to physically connect the connector member and the cap in the prior art collector structure, the cap had to be made longer by a specified length in the longitudinal axial direction, in order to secure a connection zone. However, according to the present invention, because the cap and the connector member are not connected, the tubular portion of the cap can be kept to a minimum length required for an air-tight sealing structure for air-tightly sealing the fuel gas. This also makes it possible to reduce the cost of the collector member.

The Second Embodiment

Figure 4:
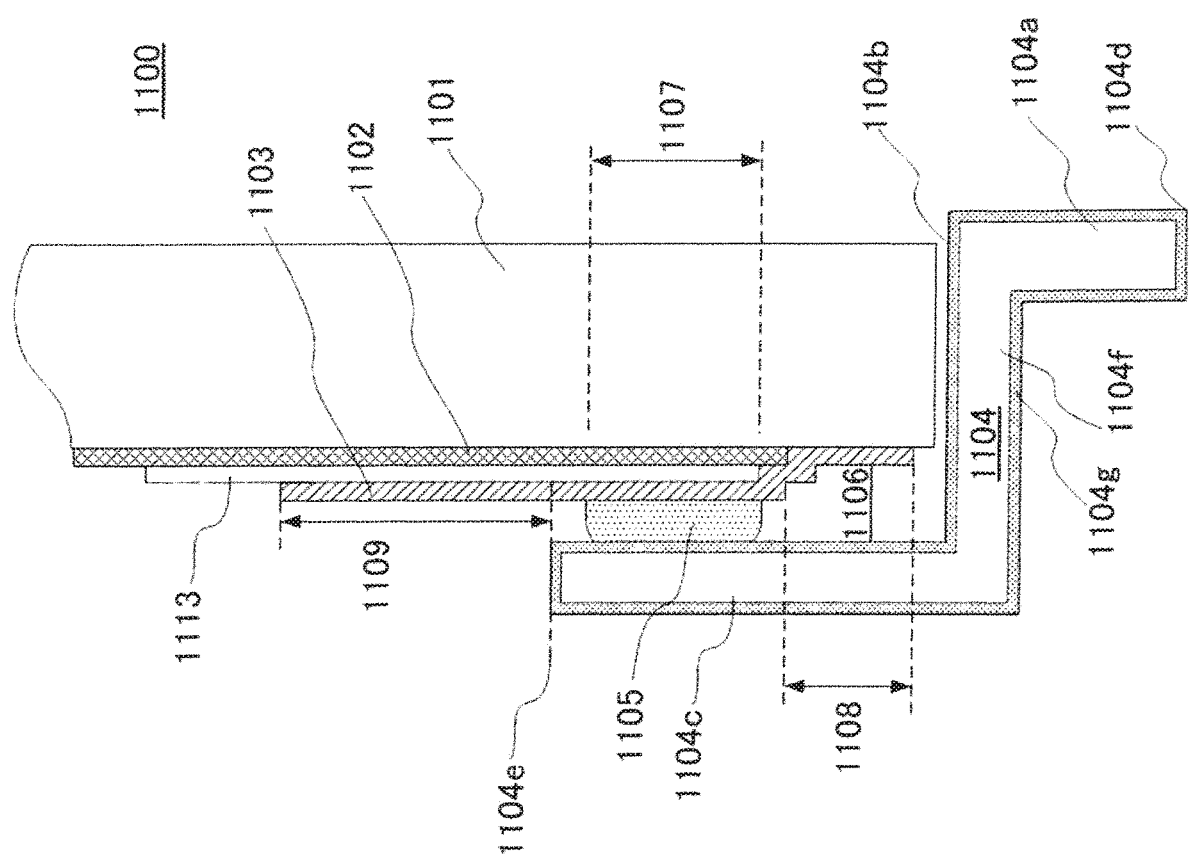
FIG. 4 is a partial sectional view of an end portion in an embodiment of the present invention.

With reference to FIG. 4, a second embodiment that differs from the above-described first embodiment will be explained below. The second embodiment differs from the first embodiment only in having an intermediate layer 1113 disposed between the solid electrolyte layer 1102 and the terminal layer 1103. The remaining structures of the two embodiments are shared, so a description of those shared portions is omitted.

In the above-described first embodiment, the terminal layer 1103 was provided on the outer surface of the solid electrolyte layer 1102. However, the physical adhesion strength of a dense ceramic material such as LSGM and a conductive layer is not necessarily strong. Accordingly, in this embodiment, the intermediate layer 1113 is disposed between the solid electrolyte layer 1102 and the terminal layer 1103. The intermediate layer 1113 forms a bonding layer (peeling prevention layer) that enhances the adhesion strength thereof.

An insulating material such as glass can be used as the intermediate layer 1113 to prevent peeling of the solid electrolyte layer 1102 and the terminal layer 1103 from each other.

As shown in FIG. 4, the intermediate layer 1113 can be disposed having its lower end positioned above the lower end of the solid electrolyte layer 1102, and having its upper end positioned above the upper end of the terminal layer 1103.

In particular, by extending the upper end position of the intermediate layer 1113 to pass the upper end of the terminal layer 1103 (projecting from the current extraction zone 1109 of the terminal layer 1103 in the longitudinal axial direction of the fuel cell unit and exposed from the terminal layer 1103) makes it possible to suppress electrical shorting between the terminal layer 1103 that is electrically connected to the fuel electrode layer 1101 and the collector layer 1112 that is electrically connected to the air electrode layer 1111, which could be caused by dendrite crystals that develop due to the migration of the silver contained in the terminal layers.

The Third Embodiment

Figure 9:
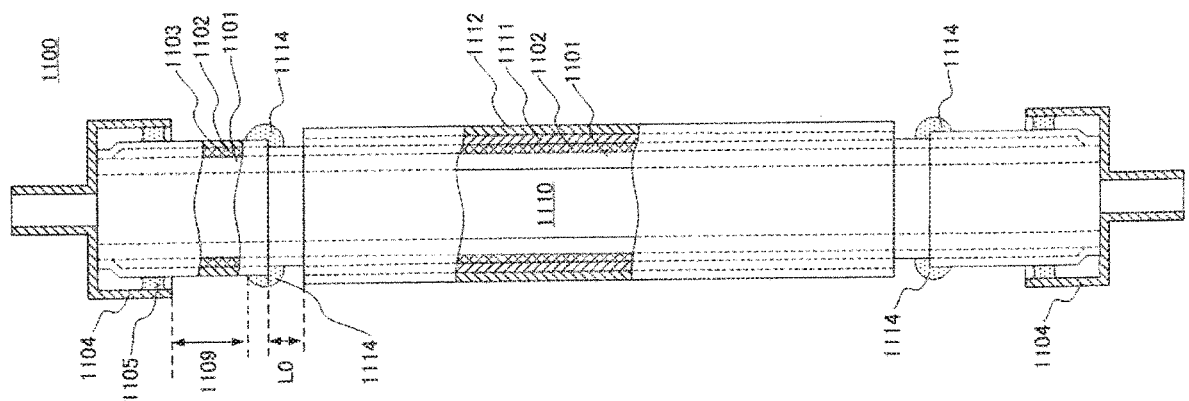
FIG. 9 is partial sectional view of a fuel cell unit according to an embodiment of the present invention.

In the second embodiment described above, the intermediate layer 1113 serves as a countermeasure against migration between terminal layers, but according to a third embodiment shown in FIG. 9, a structure that differs from the second embodiment can suppress migration that occurs between the terminal layers.

FIG. 9 illustrates the fuel cell unit 1100 according to the first embodiment to which is further provided a glass 1114. The other components are shared.

In FIG. 9, a ring-shaped glass 1114 is provided around the entire circumference of the side surface of the fuel cell unit 1100, covering an end portion extending outward from the cap 1104 of the terminal layer 1103 on the fuel electrode layer 1101. Accordingly, even if a difference in potential arises between the terminal layer 1103 that electrically connects to the fuel electrode layer 1101, and the collector layer 1112 that electrically connects to the air electrode layer 1111, the glass 1114 prevents the migration of silver, thus making it possible to prevent short-circuiting caused by migration.

It should be noted that although FIG. 9 illustrates a configuration in which the end portion of the terminal layer 1103 is covered by the glass 1114, the same effect can be achieved by covering the end portion of the collector layer 1112 with the glass 1114. It is therefore possible to prevent short-circuiting caused by migration, by covering the terminal layer end portion by the glass 1114. Accordingly, the distance between the terminal layers can be shortened, and this, in turn, is advantageous for reducing the length of the fuel cell unit.

Working Example 1

A solid oxide fuel cell device having a fuel cell unit according to embodiments of the present invention will be explained with reference to the attached drawings.

Figure 5:
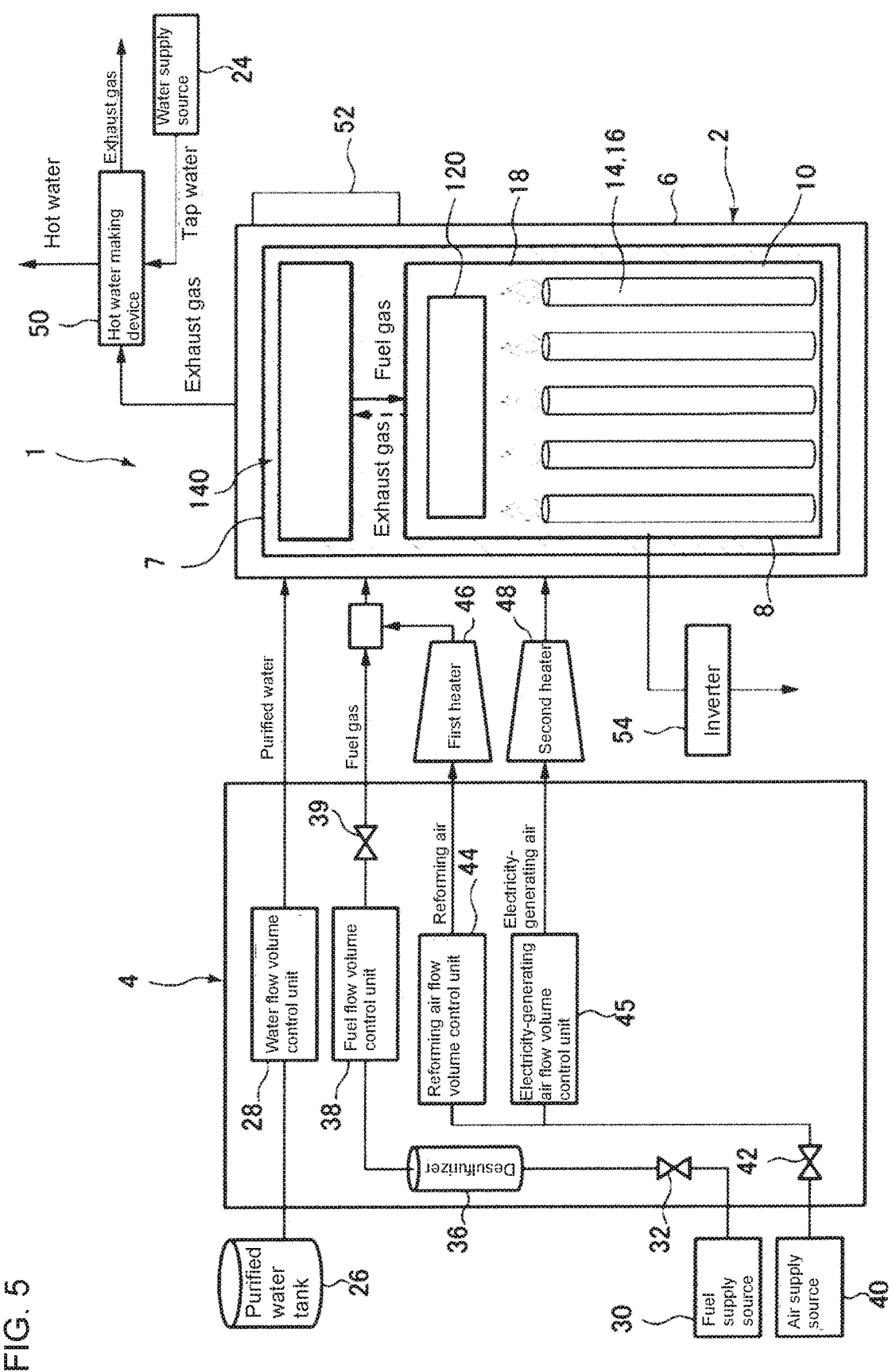
FIG. 5 is a whole view of the configuration of a solid oxide fuel cell device (SOFC) housing a fuel cell array according to a working example of the present invention.

FIG. 5 is a view showing the entire configuration of a solid oxide fuel cell (SOFC) housing fuel cell units according to one of the embodiments of the present invention. As shown in FIG. 5, a solid oxide fuel cell device 1 (SOFC) has a fuel cell module 2 and an auxiliary unit 4.

The fuel cell module 2 has a housing 6, and within this housing 6 there is a metallic module case 8, and between them is interposed a thermal insulator 7. In an electricity generation chamber 10 which is the lower portion of the module case 8 which is a sealed space, there is installed a fuel cell array 14 in which an electricity-generating reaction occurs between the fuel gas and the oxidant gas (referred to below for convenience as "electricity-generating air" or "air"). In this embodiment, the fuel cell array 14 has a plurality of serially connected fuel cells 16.

Above the electricity generation chamber 10 in the module case 8 of the fuel cell module 2, a combustion chamber 18 is formed as a combustion unit. In this combustion chamber 18, residual fuel gas that was not used in the electricity-generating reaction and residual air are burned, forming an exhaust gas (i.e., a combustion gas). Moreover, the module case 8 is surrounded by the thermal insulator 7, which inhibits the heat within the fuel cell module 2 from escaping to the outside. In addition, above the combustion chamber 18 there is installed a reformer unit 120 that reforms the fuel gas, and the combustion heat of the residual gas heats the reformer unit 120 to a temperature that makes a reforming reaction possible.

Above the module case 8 within the housing 6, an evaporator 140 is provided within the thermal insulator 7. The evaporator 140 vaporizes water to form water vapor by implementing heat exchange between supplied water and the exhaust gas. A gas mixture containing the water vapor and the starting material gas (referred to below as "fuel gas") is supplied to the reformer unit 120 inside the module case 8.

An auxiliary unit 4 has a purified water tank 26 for storing purified water resulting from the condensation and filtration of water contained in exhaust gas from the fuel cell module 2, and a water flow volume control unit 28 (such as a "water pump" driven by a motor) that regulates the volume of water supplied from a storage tank. The auxiliary unit 4 has a gas cut-off valve 32 that cuts off fuel such as city gas supplied by a fuel supply source 30, a desulfurizer 36 for removing sulfur from the fuel gas, a fuel flow volume control unit 38 (such as a "fuel pump" driven by a motor) that regulates the flow volume of the fuel gas, and a valve 39 that cuts off fuel gas from flowing from a fuel flow volume control unit 38 when the power is lost. The auxiliary unit 4 also has an electromagnetic valve 42 that cuts off air supplied from an air supply source 40, a reforming air flow volume control unit 44 that regulates the flow volume of air and an electricity-generating air flow volume control unit 45 (with a motor-driven "air blower"), a first heater 46 that heats the reforming air supplied to the reformer unit 120, and a second heater 48 that heats the electricity-generating air supplied to the electricity-generating chamber. The first heater 46 and the second heater 48 are provided to efficiently raise the temperature when starting, but they may be omitted.

The embodiment may be configured such that within the reformer unit 120 when the device is started, first only a PDX step consisting of a partial oxidation reforming reaction (PDX) takes place, followed by an ATR step consisting of an auto-thermal reforming reaction (ATR) that combines a partial oxidation reforming reaction (PDX) and a steam reforming reaction (SR), then followed by an SR step in which only a steam reforming reaction takes place. The PDX step may be omitted and the process may proceed from the ATR step to the SR step. Both PDX step and ATR step may be omitted, so that only the SR step takes place. In cases where only the SR step tales place, the reforming air flow volume control unit 44 is not needed.

Next, a hot water making device 50 that is supplied with the exhaust gas is connected to the fuel cell module 2. Tap water is supplied from a water supply source 24 to the hot water making device 50. The tap water is heated by the heat of the exhaust gas, and supplied to a hot water storage tank of an external hot water supply device that is not pictured. In addition, a control box 52 is attached to the fuel cell module 2 for controlling the supply amount of fuel gas. Moreover, an inverter 54 that serves as a power extractor (power converter) for supplying power generated by the fuel cell module to the outside is connected to the fuel cell module 2.

Figure 6:
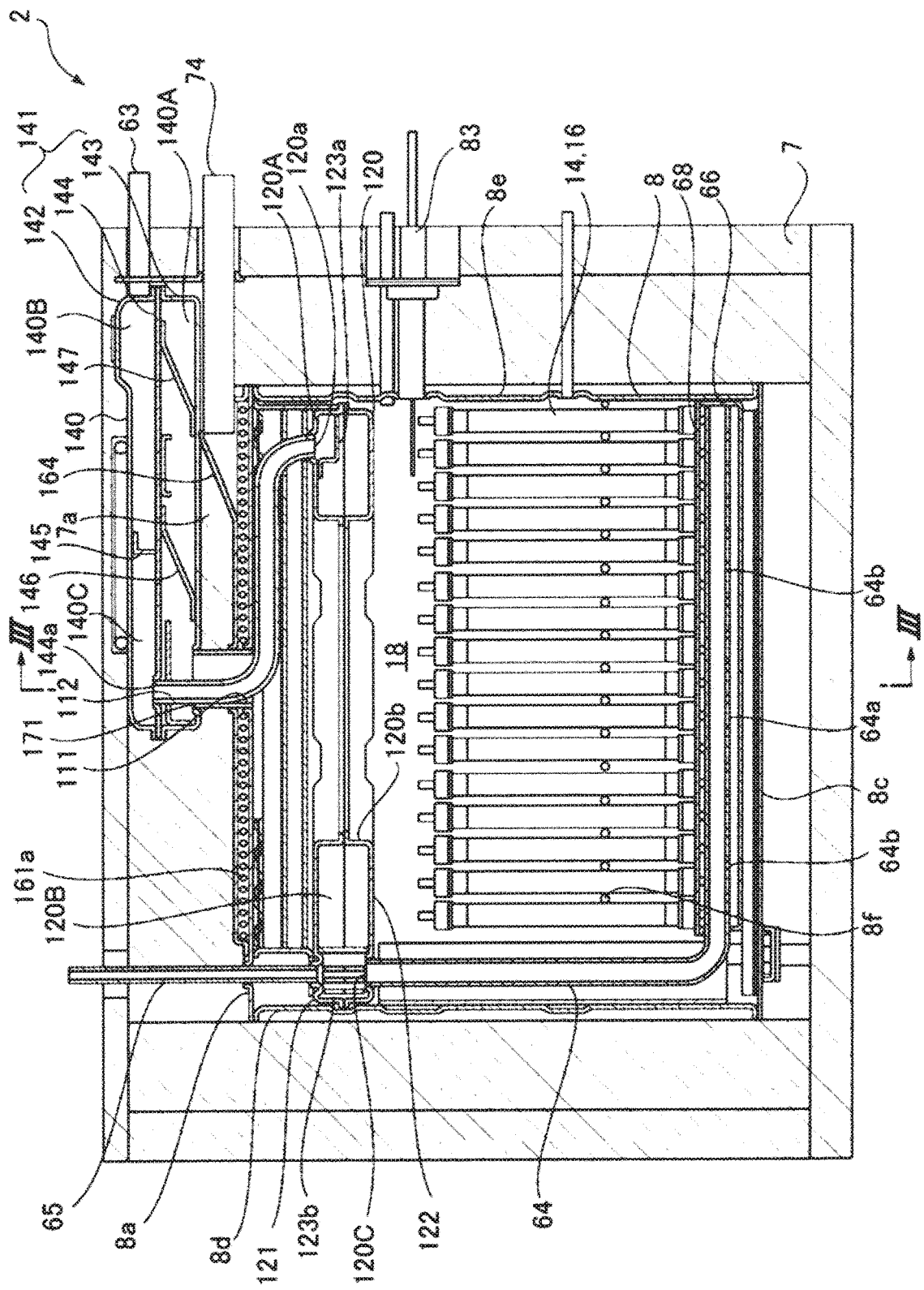
FIG. 6 is a lateral sectional view of a fuel cell module having a fuel cell array according to a working example of the present invention.
Figure 7:
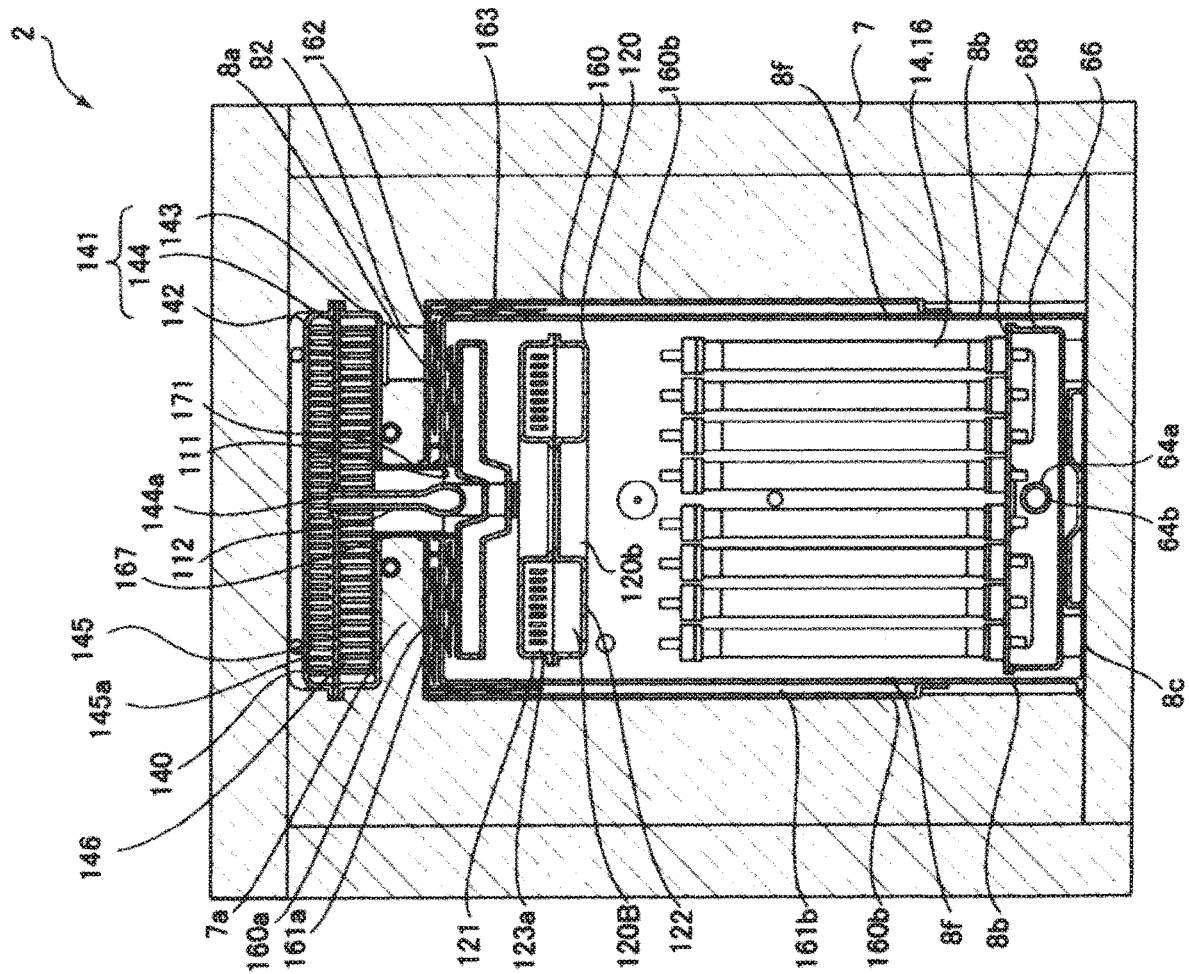
FIG. 7 is a sectional view of a fuel cell module taken along the line in FIG. 6.

Next, the structure of the fuel cell module housed within the fuel cell array according to this embodiment will be explained with reference to FIG. 6 to FIG. 8. FIG. 6 is a lateral sectional view of a fuel cell module of a solid oxide fuel cell device; FIG. 7 is a sectional view of a fuel cell module taken along the line in FIG. 6; and FIG. 8 is an exploded oblique view of a module case and a ventilation cover.

As shown in FIG. 6 and FIG. 7, the fuel cell module 2 has the fuel cell array 14 and the reformer unit 120 disposed within the module case 8 surrounded by the thermal insulator 7, as well as the evaporator 140 disposed outside of the module case 8 and inside the thermal insulator 7.

Figure 8:
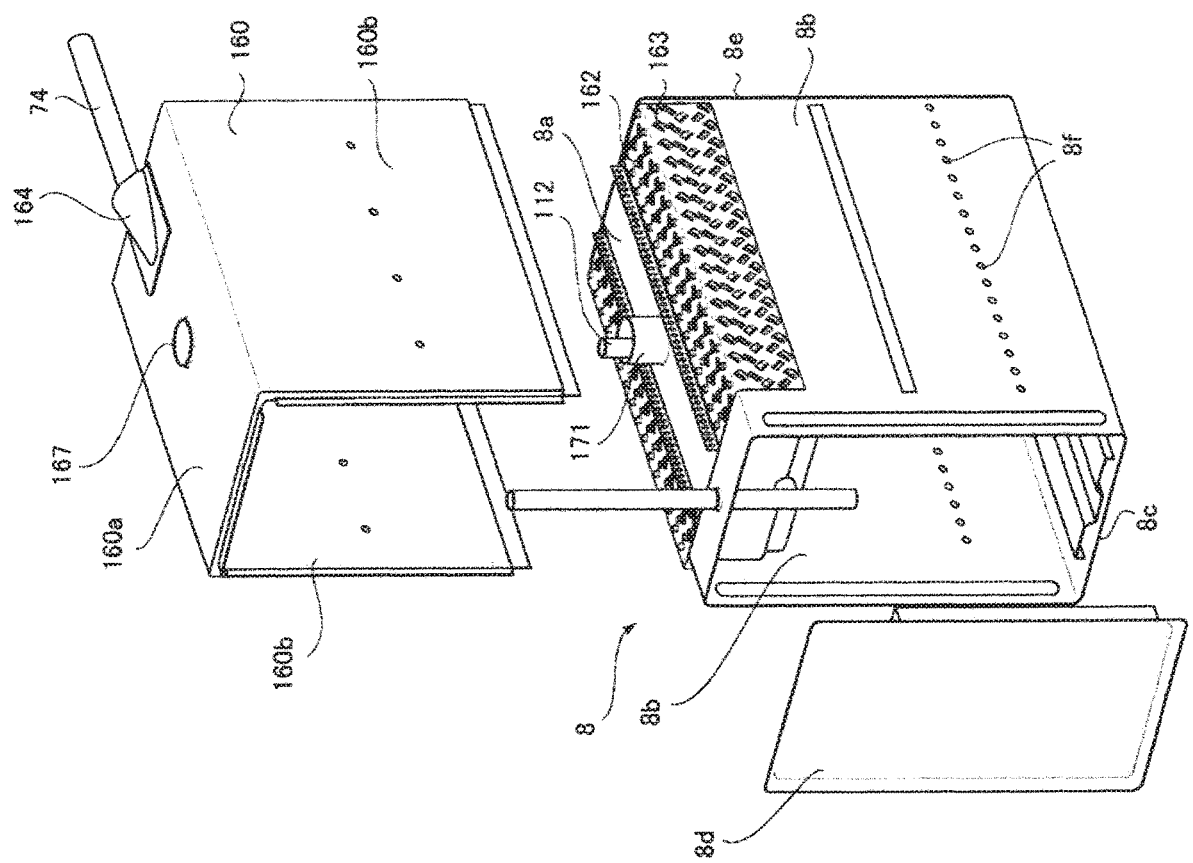
FIG. 8 is an exploded oblique view of an air ventilation cover and a module case housing a fuel cell array according to an embodiment of the present invention.

First, as shown in FIG. 8, the module case 8 is formed from a tubular body formed from a substantially rectangular top plate 8a, a bottom plate 8c, and a pair of opposing side plates 8b connecting the sides of the plates 8a and 8c extending in the longitudinal direction (the horizontal direction in FIG. 6), as well as closed side plates 8d and 8e connecting the sides of the top and bottom plates 8a and 8c extending in the width-wise direction (the horizontal direction in FIG. 7) to close the opposing openings located at the longitudinal ends of the tubular body.

In the module case 8, the top plate 8a and the side plate 8b are covered by an air ventilation cover 160. The air ventilation cover 160 has a top plate 160a and a pair of opposing side plates 160b. An open portion 167 for an exhaust pipe 171 to pass through is provided in approximately the center portion of the top plate 160a. Separation at a specified distance is provided between the top plate 160a and the top plate 8a, and between the side plate 160b and the side plate 8b. Accordingly, air ventilation channels 161a and 161b are formed as oxidant gas supply channels between the outer side of the module case 8 and the heat insulator 7, and specifically, between the top plate 8a and the side plate 8b of the nodule case 8, and the top plate 160a and the side plate 160b of the air ventilation cover 160 (see FIG. 7).

At the lower portion of the side plate 8b of the module case 8, there is provided a blow-off port 8f which has a plurality of through-holes (see FIG. 8). The electricity-generating air is supplied to inside the air ventilation channel 161a via a flow-channel direction regulator 164 from an electricity-generating air inlet pipe 74 provided at approximately the center portion on the closed side plate 8e side of the module case 8 (see FIG. 6 and FIG. 8). The electricity-generating air flows through the air ventilation channels 161a and 161b and is blown into the electricity generation chamber 10 from the blow-off port 8f toward the fuel cell array 14 (see FIG. 7 and FIG. 8).

Inside the air ventilation channels 161a and 161b, plate fins 162 and 163 are provided to function as thermal exchange promoting members (see FIG. 7). The plate fin 162 is disposed horizontally so as to extend longitudinally and laterally between the top plate 8a and the air ventilation cover 160 of the module case 8, and the plate fin 163 is disposed so as to extend longitudinally and vertically at a position above the fuel cell 16.

The electricity-generating air that flows through the air ventilation channels 161a and 161b undergoes thermal exchange with the exhaust gas that passes through the module case 8 (specifically, an exhaust gas channel disposed along the top plate 8a and the side plate 8b) on the inner side of the plate fins 162 and 163, particularly when passing through the plate fins 162 and 163. Because of such an arrangement, the portion where the plate fins 162 and 163 are provided in the air ventilation channels 161a and 161b functions as a heat-exchanger (thermal exchange unit). The portion where the plate fin 162 is provided serves as the primary thermal exchange unit, while the portion where the plate fin 163 is disposed serves as a secondary thermal exchange unit.

The evaporator 140 is affixed in such a manner as to extend horizontally above the top plate 8a of the module case 8. In addition, a portion 7a of the insulator 7 is arranged so as to fill in the space between the evaporator 140 and the module case 8 (see FIG. 6 and FIG. 7).

In detail, on one end side of the evaporator 140 in the longitudinal direction (the horizontal direction in FIG. 6), there are connected a fuel supply pipe 63 that supplies water and fuel starting material gas (it may contain reforming air) and an exhaust gas discharge pipe 82 (see FIG. 7) for discharging exhaust gas, while on the other end side of the evaporator 140 in the longitudinal direction, the upper end portion of an exhaust pipe 171 is connected. The exhaust pipe 171 extends downward, passing through an opening 167 formed in the top plate 160a of the air ventilation cover 160, and is connected to an exhaust port 111. The exhaust port 111 is an opening for discharging exhaust gas formed in the combustion chamber 18 inside the module case 8 to the outside of the module case 8, and it is formed in approximately the center of the top plate 8a formed in a substantially rectangular shape as viewed from above the module case 8.

As shown in FIG. 6 and FIG. 7, the evaporator 140 has a substantially rectangular evaporator case 141 as viewed from above. The evaporator case 141 is formed from an upper side case 142 and a lower side case 143 which are two low-profile bottomed rectangular tubes, and between these there is inserted an intermediate plate 144 that connects them.

Therefore, the evaporator case 141 has a two-tiered structure in the vertical orientation, with the lower tier having an exhaust channel portion 140A through which passes the exhaust gas supplied from the exhaust pipe 171, and with the upper tier having an evaporation portion 140B that evaporates water supplied from the fuel supply pipe 63 to produce water vapor, and a mixing portion 140C that mixes the water vapor produced by the evaporation portion 140B and the starting material gas supplied from the fuel supply pipe 63.

As shown in FIG. 6 and FIG. 7, the evaporation portion 140B and the mixing portion 140C are formed as partitioned spaces in the evaporator 140, partitioned by means of a partitioning plate 145 formed with a plurality of communicating holes (slits) 145a. Moreover, the evaporation portion 140B is filled with alumina balls (not pictured). In addition, the exhaust channel portion 140A is partitioned into three spaces from the upstream side across to the downstream side of the exhaust gas by means of two partitioning plates 146 and 147 that likewise have a plurality of communicating holes. The second space is filled with a combustion catalyst (not pictured). That is to say, in this embodiment, the evaporator 140 includes a combustion catalyst unit in the lower tier of the vertical two-tiered structure.

In such an evaporator 140, heat exchange is carried out between the water in the evaporation portion 140B and the exhaust gas passing through the exhaust gas channel portion 140A, with the heat of the exhaust gas causing the water in the evaporation portion 140 B to vaporize, resulting in water vapor. Heat exchange is also carried out between the gas mixture in the mixing portion 140C and the exhaust gas passing through the exhaust channel portion 140A, so the temperature of the gas mixture is raised by the heat of the exhaust gas.

As shown in FIG. 6, a gas mixture supply pipe 112 for supplying the mixed gas to the reformer unit 120 is connected to the mixing portion 140C. The gas mixture supply pipe 112 is arranged so as to pass through the exhaust pipe 171, with one end being connected to an opening 144a formed in the intermediate plate 144, while the other end is connected to a gas mixture supply port 120a formed on a top surface of the reformer unit 120. The gas mixture supply pipe 112 passes through the inside of the exhaust gas channel portion 140A and inside the exhaust pipe 171, and extends downward in the vertical direction down to the inside of the module case 8, where it bends about 90° and extends horizontally along the top plate 8a, and then bends downwards about 90° and is connected to the reformer unit 120.

The reformer unit 120 is disposed above the combustion chamber 18 and extends horizontally along the longitudinal direction of the module case 8, and is anchored to the top plate 8a. The reformer unit 120 has an approximately rectangular shape as viewed from above, but in its center portion there is formed a through-hole 120b that makes the reformer unit 120 ring-shaped, and it has a casing that is formed by joining an upper side case 121 and a lower side case 122. The through-hole 120b is positioned in such a manner that, when viewed from above, it overlaps with the exhaust port 111 formed in the top plate 8a. Preferably, the exhaust port 111 is formed in the central position of the through hole 120b.

At one end side in the longitudinal direction of the reformer unit 120 (at the side plate 8e side of the module case 8), the gas mixture supply pipe 112 is connected to the gas mixture supply port 120a disposed at the upper side case 121, and at the other end (the closed side plate 8d side), a fuel gas supply pipe 64 is connected to the lower side case 122, and a hydrogen extraction pipe 65 for a hydrodesulfurizer that extends to the desulfurizer 36 is connected to the upper side case 121. Therefore, the reformer unit 120 is constructed such that it receives the gas mixture (i.e., the starting material gas mixed with water vapor (it may contain reforming air)) from the gas mixture supply pipe 112, then reforms the gas mixture internally, and then discharges the gas after reforming (i.e., the fuel gas) from the fuel gas supply pipe 64 and the hydrogen extraction pipe 65 for the hydrodesulfurizer.

Because internal space of the reformer unit 120 is partitioned into three spaces by two partitioning plates 123a and 123b, it is formed from a gas mixture receiving part 120A that receives the gas mixture from the gas mixture supply pipe 112, a reforming part 120B filled with a reforming catalyst (not pictured) for reforming the gas mixture, and a gas discharge part 120C that discharges the gas that has passed through the reforming part 120B (see FIG. 6). The reforming part 120B is a space inserted between the partitioning plates 123a and 123b, and the reforming catalyst is held in this space. The gas mixture and the fuel gas after reforming are able to migrate by passing through a plurality of communicating holes (slits) provided in the partitioning plates 123a and 123b. The reforming catalyst may be an alumina with nickel added to its spherical surface or an alumina with ruthenium added to its spherical surface.

The gas mixture supplied from the evaporator 140 via the gas mixture supply pipe 112 is injected through the gas mixture supply port 12a into the gas mixture receiving part 120A. This gas mixture expands inside the gas mixture receiving part 120A and the injection velocity falls, and the gas mixture is supplied to the reforming part 120B, passing through the partitioning plate 123a. In the reforming part 120B, the gas mixture that migrates at a reduced velocity is reformed to a fuel gas by a reforming catalyst. This fuel gas passes through the partitioning plate 123b and is supplied to the gas discharge part 120C. In the gas discharge part 120C, the fuel gas is discharged to the fuel gas supply pipe 64 and to the hydrogen extraction pipe 65 for the hydrodesulfurizer.

The fuel gas supply pipe 64 serving as a fuel gas supply channel extends downward along the closed side plate 8d within the module case 8, then bends about 90° and extends horizontally to enter a manifold 66 formed below the fuel cell array 14, and then extends horizontally again up to the vicinity of the closed plate 8e on the opposite side. A plurality of fuel supply holes 64b are formed on a lower surface of a horizontal portion 64a of the fuel gas supply pipe 64, and the fuel gas is supplied to the manifold 66 from the fuel supply holes 64b. A lower support plate 68 having through-holes to support the fuel array 14 is attached above the manifold 66, and the fuel gas inside the manifold 66 is supplied to inside the fuel cells 16. An ignition device 83 for initiating combustion of the fuel gas and air is provided to the combustion chamber 18. The reformer unit 120 is disposed so as to be at a specified distance in a horizontal direction from the side plate 8b of the module case 8.

Working Example 2

Figure 10:
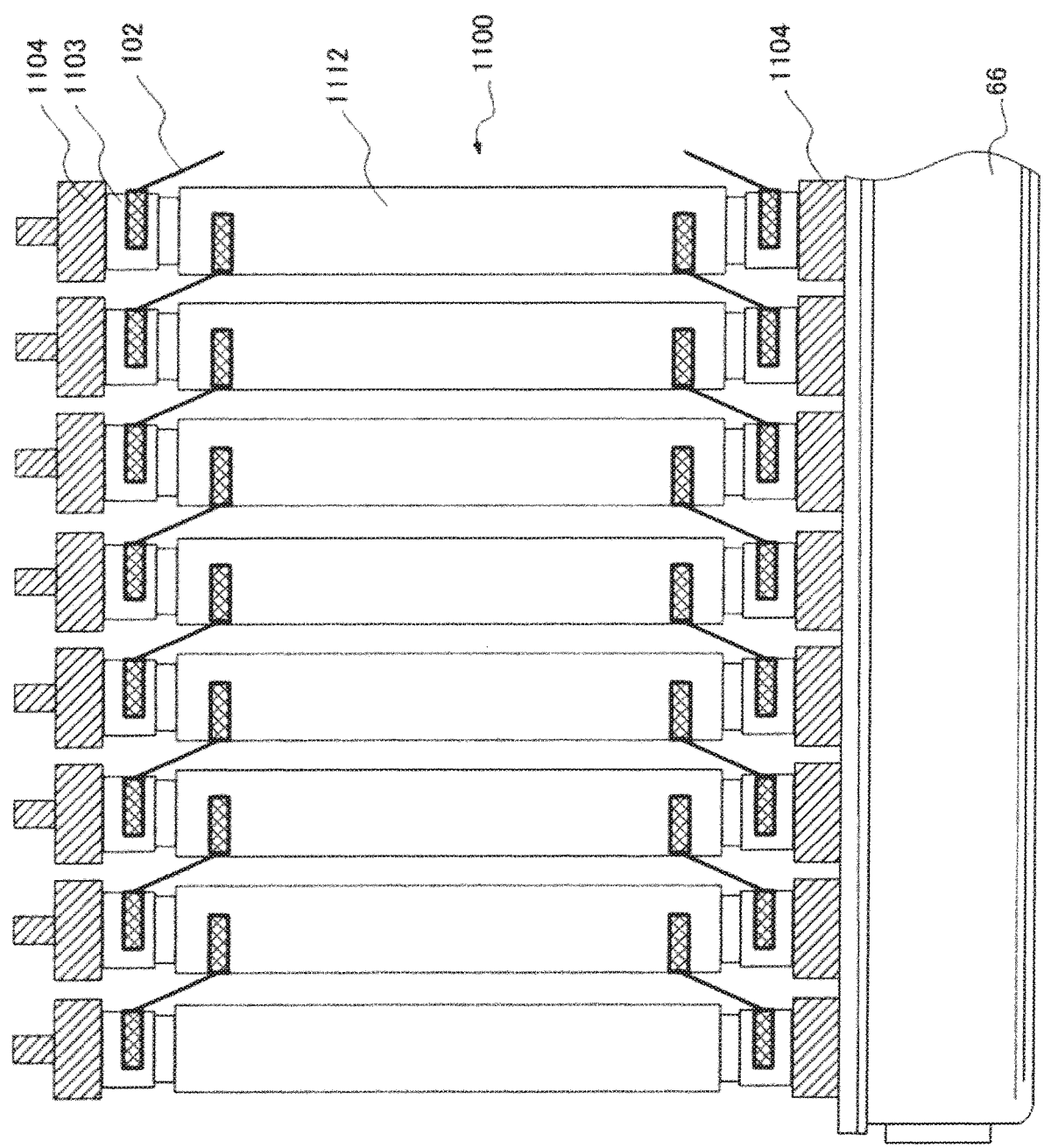
FIG. 10 is a side view of a fuel cell unit according to a working example of the present invention.

FIG. 10 is a lateral sectional view illustrating a portion of a fuel cell array according to this working example.

As shown in FIG. 10, the fuel cell array has a plurality of arranged fuel cell units 1100. The fuel cell units 1100 are each supported by a rectangular metallic lower support plate at its lower end. These lower support plates form a top surface of the manifold 66, and through-holes are formed to allow fuel gas to flow into an internal flow channel 1110 of each fuel cell unit 1100. In addition, a substantially cylindrical ceramic spacer (not pictured) is disposed between a cap 1104 on a lower end side of each fuel cell unit 1100 and the lower support plate. Insulation properties are ensured by setting the cap 1104 and the lower support plate at a distance from each other.

Moreover, a connector member 102 that electrically connects one fuel cell unit 1100 to an adjacent fuel cell unit 1100 is attached to each fuel cell unit 1100. The connector member 102 is arranged so as to electrically connect a terminal layer 1103 that is electrically connected to a fuel electrode layer to a collector layer 1112 connected to an air electrode layer of the adjacent fuel cell unit 1100. In addition, since each connector member 102 is attached to the upper end and the lower end of each fuel cell unit, the fuel cell unit 1100 adjacent to one fuel cell unit 1100 is electrically connected by two connector members 102 (these two connector members 102 are in parallel). Accordingly, all of the fuel cell units 1100 forming the fuel cell array are electrically connected in series by each connector member 102. With the electrical connections among the fuel cell units according to the present invention, it is possible to electrically connect fuel cell units only by means of the connector members, rather than via a cap as in the prior art, and thus it becomes possible to eliminate a connection resistance component due to mediation of the cap, thereby enhancing extraction efficiency. Moreover, because short-circuiting between fuel cells due to contact between caps is eliminated, it is possible to narrow the intervals between adjacent fuel cell units so as to achieve a higher level of integration.

In this working example, the connector member 102 is attached to the upper end and the lower end, in order to connect the fuel cell units to each other, but this working example is not limited thereto. For example, a structure attaching only to the upper end, or a structure attaching only to the lower end, or a structure attaching to the center portion of the fuel cell unit 1100 can be suitably designed, with consideration given to the electricity-generating performance, electrical current extracting performance, and durability of the fuel cell unit.

What is claimed is:

1. A fuel cell array comprising a plurality of serially connected fuel cell units configured to generate electricity by reaction of a fuel gas and an oxidant gas, a respective fuel cell unit comprising:
   (a) a fuel cell being in a tubular shape extending in a longitudinal direction and having an end opening at each end thereof communicating with each other via an internal flow channel formed through an inside of the fuel cell; and
   (b) a tubular cap capped on each end of the fuel cell, the tubular cap having a tubular skirt wrapping around the fuel cell with a tubular space formed between an inner surface of the tubular skirt and an outer surface of the fuel cell, the tubular cap comprising a flow-through port communicating with the internal flow channel of the fuel cell,
   the fuel cell comprising:
   (a-1) a laminate of electro-chemical reaction layers each being in a tubular shape and collectively forming the fuel cell, the laminate of electro-chemical reaction layers including:
   a fuel electrode layer provided radially innermost of the fuel cell to define the internal flow channel inside of the fuel electrode layer in communication with the end openings of the fuel cell for the fuel gas to flow therethrough in the longitudinal direction of the fuel cell;
   a solid electrolyte layer laminated on an outer surface of the fuel electrode layer; and
   an air electrode layer laminated on an outer surface of the solid electrolyte layer, wherein the fuel cell comprises (i) a fuel electrode layer exposition area formed near one end of the fuel cell, the fuel electrode layer exposition area having the fuel electrode layer devoid of lamination thereon of the solid electrolyte layer and the air electrode layer, and (ii) a solid electrolyte layer exposition area formed continuously in the longitudinal direction from the fuel electrode layer exposition area toward the other end of the fuel cell, the solid electrolyte layer exposition area having the solid electrolyte layer devoid of lamination thereon of the air electrode layer; and
   (a-2) an electrically conductive terminal layer forming an outermost laminate of the fuel cell at said one end of the fuel cell and extending in the longitudinal direction from said one end of the fuel cell toward the other end thereof to terminate past the tubular skirt of the tubular cap to form a connection area, which is not covered by the tubular cap, wherein the terminal layer is directly laminated on the fuel electrode layer in the fuel electrode layer exposition area in electrical contact with the fuel electrode layer and directly laminated on the solid electrolyte layer in the solid electrolyte layer exposition area so that the terminal layer functions to electrically connect the fuel electrode layer of the fuel cell to an air electrode layer of an adjacent fuel cell in the fuel cell array,
   the fuel cell unit further comprising a glass material forming a sealing layer circumferentially around the fuel cell to fill between the inner surface of the tubular cap and the outer surface of the fuel cell at a location between the fuel electrode layer exposition area and the connection area, wherein the tubular cap is electrically isolated from the fuel cell.

2. The fuel cell array according to claim 1, wherein the terminal layer has a thickness thinner than a thickness of the sealing layer formed of the glass material.

3. The fuel cell array according to claim 2, wherein the terminal layer contains a chemical element that diffuses into the solid electrolyte layer at the solid electrolyte layer exposition area.

4. The fuel cell array according to claim 3, wherein the terminal layer contains a chemical element that diffuses into the fuel electrode layer in the fuel electrode layer exposition area.

5. The fuel cell array according to claim 4, wherein the fuel cell comprises a peeling prevention layer provided between the solid electrolyte layer and the terminal layer in the solid electrolyte layer exposition area.

6. The fuel cell array according to claim 5, wherein the peeling prevention layer has glass as its primary constituent.

7. The fuel cell array according to claim 6, wherein the peeling prevention layer extends in the longitudinal direction toward the other end of the fuel cell between the solid electrolyte layer and the terminal layer and terminates in the solid electrolyte layer exposition area past a terminal end of the terminal layer.

8. The fuel cell array according to claim 1, wherein the tubular cap is formed from stainless steel containing aluminum and comprises an insulating film formed all around an inner and outer surfaces of the tubular cap.

9. The fuel cell array according to claim 8, wherein the insulating film has a thickness of 0.1 µm or greater.

10. A fuel cell array comprising a plurality of serially connected fuel cell units configured to generate electricity by reaction of a fuel gas and an oxidant gas, a respective fuel cell unit comprising:
    (a) a fuel cell being in a tubular shape extending in a longitudinal direction and having an end opening at each end thereof communicating with each other via an internal flow channel formed through an inside of the fuel cell; and
    (b) a tubular cap capped on each end of the fuel cell, the tubular cap having a tubular skirt wrapping around the fuel cell with a tubular space formed between an inner surface of the tubular skirt and an outer surface of the fuel cell, the tubular cap comprising a flow-through port communicating with the internal flow channel of the fuel cell,
    the fuel cell comprising:
    (a-1) a laminate of electro-chemical reaction layers each being in a tubular shape and collectively forming the fuel cell, the laminate of electro-chemical reaction layers including:
    a fuel electrode layer provided radially innermost of the fuel cell to define the internal flow channel inside of the fuel electrode layer in communication with the end openings of the fuel cell for the fuel gas to flow therethrough in the longitudinal direction of the fuel cell;

a solid electrolyte layer laminated on an outer surface of the fuel electrode layer; and an air electrode layer laminated on an outer surface of the solid electrolyte layer, wherein the fuel cell comprises (i) a fuel electrode layer exposition area formed near one end of the fuel cell, the fuel electrode layer exposition area having the fuel electrode layer devoid of lamination thereon of the solid electrolyte layer and the air electrode layer, and (ii) a solid electrolyte layer exposition area formed continuously in the longitudinal direction from the fuel electrode layer exposition area toward the other end of the fuel cell, the solid electrolyte layer exposition area having the solid electrolyte layer devoid of lamination thereon of the air electrode layer; and (a-2) an electrically conductive terminal layer forming an outermost laminate of the fuel cell at said one end of the fuel cell and extending in the longitudinal direction from said one end of the fuel cell toward the other end thereof to terminate past the tubular skirt of the tubular cap to form a connection area, which is not covered by the tubular cap, wherein the terminal layer is directly laminated on the fuel electrode layer in the fuel electrode layer exposition area in electrical contact with the fuel electrode layer and directly laminated on the solid electrolyte layer in the solid electrolyte layer exposition area, and further wherein the terminal layer forms part of an electrical path for electrically connecting the fuel electrode layer of the fuel cell to an air electrode layer of an adjacent fuel cell in the fuel cell array, and the electrical path does not include the tubular cap, the fuel cell unit further comprising a glass material forming a sealing layer circumferentially around the fuel cell to fill between the inner surface of the tubular cap and the outer surface of the fuel cell at a location between the fuel electrode layer exposition area and the connection area.

11. A fuel cell array comprising a plurality of serially connected fuel cell units configured to generate electricity by reaction of a fuel gas and an oxidant gas, a respective fuel cell unit comprising:

(a) a fuel cell being in a tubular shape extending in a longitudinal direction and having an end opening at each end thereof communicating with each other via an internal flow channel formed through an inside of the fuel cell; and (b) a tubular cap capped on each end of the fuel cell, the tubular cap having a tubular skirt wrapping around the fuel cell with a tubular space formed between an inner surface of the tubular skirt and an outer surface of the fuel cell, the tubular cap comprising a flow-through port communicating with the internal flow channel of the fuel cell, wherein the tubular cap is formed from stainless steel containing aluminum and comprises an insulating film formed all around an inner and outer surface of the tubular cap, the fuel cell comprising:

(a-1) a laminate of electro-chemical reaction layers each being in a tubular shape and collectively forming the fuel cell, the laminate of electro-chemical reaction layers including:

a fuel electrode layer provided radially innermost of the fuel cell to define the internal flow channel inside of the fuel electrode layer in communication with the end openings of the fuel cell for the fuel gas to flow therethrough in the longitudinal direction of the fuel cell;

a solid electrolyte layer laminated on an outer surface of the fuel electrode layer; and an air electrode layer laminated on an outer surface of the solid electrolyte layer, wherein the fuel cell comprises (i) a fuel electrode layer exposition area formed near one end of the fuel cell, the fuel electrode layer exposition area having the fuel electrode layer devoid of lamination thereon of the solid electrolyte layer and the air electrode layer, and (ii) a solid electrolyte layer exposition area formed continuously in the longitudinal direction from the fuel electrode layer exposition area toward the other end of the fuel cell, the solid electrolyte layer exposition area having the solid electrolyte layer devoid of lamination thereon of the air electrode layer; and (a-2) an electrically conductive terminal layer forming an outermost laminate of the fuel cell at said one end of the fuel cell and extending in the longitudinal direction from said one end of the fuel cell toward the other end thereof to terminate past the tubular skirt of the tubular cap to form a connection area, which is not covered by the tubular cap, wherein the terminal layer is directly laminated on the fuel electrode layer in the fuel electrode layer exposition area in electrical contact with the fuel electrode layer and directly laminated on the solid electrolyte layer in the solid electrolyte layer exposition area so that the terminal layer functions to electrically connect the fuel electrode layer of the fuel cell to an air electrode layer of an adjacent fuel cell in the fuel cell array, the fuel cell unit further comprising a glass material forming a sealing layer circumferentially around the fuel cell to fill between the inner surface of the tubular cap and the outer surface of the fuel cell at a location between the fuel electrode layer exposition area and the connection area.

* * * * *